(12) United States Patent
Johnson et al.

(10) Patent No.: US 12,106,066 B2
(45) Date of Patent: Oct. 1, 2024

(54) APPARATUSES, SYSTEMS, AND METHODS FOR PROVIDING AUTOMATED QUESTION GENERATION FOR DOCUMENTS

(71) Applicant: VitalSource Technologies LLC, La Vergne, TN (US)

(72) Inventors: Benny G. Johnson, Delmont, PA (US); Jeffrey S. Dittel, Oconomowoc, WI (US)

(73) Assignee: VitalSource Technologies LLC, Raleigh, NC (US)

( * ) Notice: Subject to any disclaimer, the term of this patent is extended or adjusted under 35 U.S.C. 154(b) by 325 days.

(21) Appl. No.: 17/574,727

(22) Filed: Jan. 13, 2022

(65) Prior Publication Data
US 2022/0230001 A1 Jul. 21, 2022

Related U.S. Application Data

(60) Provisional application No. 63/138,902, filed on Jan. 19, 2021.

(51) Int. Cl.
*G06F 40/58* (2020.01)
*G06F 40/284* (2020.01)
*G09B 7/00* (2006.01)

(52) U.S. Cl.
CPC ........... *G06F 40/58* (2020.01); *G06F 40/284* (2020.01); *G09B 7/00* (2013.01)

(58) Field of Classification Search
CPC ......... G09B 7/00; G06F 40/284; G06F 40/58; G06F 16/3337; G06F 40/45
See application file for complete search history.

(56) References Cited

U.S. PATENT DOCUMENTS

| 2016/0350285 | A1 | 12/2016 | Zhao et al. | |
| 2020/0201943 | A1* | 6/2020 | Murakami | G06N 20/00 |
| 2024/0012996 | A1* | 1/2024 | Chosa | G06F 40/53 |

OTHER PUBLICATIONS

Vishwajeet Kumar et al., 'Cross-Lingual Training for Automatic Question Generation', arXiv: 1906. 02525, Jun. 2019, pp. 1-9 [retrieved on Apr. 7, 2022]. Retrieved from <https://arxiv.org/abs/1906.02525> pp. 1-8.

(Continued)

*Primary Examiner* — Thomas H Maung
(74) *Attorney, Agent, or Firm* — Baker, Donelson, Bearman, Caldwell & Berkowitz, P.C.; Edward D. Lanquist; Paulluvi Henley

(57) ABSTRACT

Apparatuses, systems, and methods are provided for parallel construction for question generation (QG) corresponding to a content item. Text of at least a portion of the content item may be extracted as a source language text, at least a portion of which may be translated to generate a parallel text having a primary language different from the source language. The source and primary language texts may be aligned to create an aligned source language text and an aligned primary language text. A QG strategy may be determined and at least one step to be performed on the aligned primary language text may be generated based at least in part upon the determined QG strategy. At least one parallel operation corresponding to the at least one step to be performed on the aligned primary language text may be constructed, and a source language question may be generated.

17 Claims, 11 Drawing Sheets

(56) References Cited

OTHER PUBLICATIONS

Aizhan Imankulova et al., 'Improving Low-Resource Neural Machine Translation with Filtered Pseudo-parallel Corpus', Proceedings of the 4th Workshop on Asian Translation, Nov. 27, 2017, pp. 70-78 [retrieved on Apr. 7, 2022]. Retrieved from <https://aclanthology.org/W17-5704.pdf> pp. 70-77.

Zewen Chi et.al., 'Cross-Lingual Natural Language Generation via Pre-Training', arXiv:1909.10481v3, Nov. 22, 2019, pp. 1-9 [retrieved on Apr. 7, 2022]. Retrieved from <http://arxiv.org/abs/1909.10481v3> pp. 1-7.

Michael Heilman, 'Automatic Factual Question Generation from Text', 2011, pp. 1-195 [retrieved on Apr. 7, 2022]. Retrieved from <https://lti.cs.cmu.edu/sites/default/files/research/thesis/2011/michael_heilman_automatic_factual_question_generation_for_reading_assessment.pdf> pp. 1-158.

\* cited by examiner

APPARATUSES, SYSTEMS, AND METHODS FOR PROVIDING AUTOMATED QUESTION GENERATION FOR DOCUMENTS

CROSS-REFERENCES TO RELATED APPLICATIONS

This application claims the benefit of U.S. Provisional Patent Application No. 63/138,902, filed Jan. 19, 2021, entitled "Apparatuses, Systems, and Methods for Providing Automated Question Generation for Documents," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

Numerous problems exist in the art in relation to Natural Language Processing (NLP), especially when dealing with multiple languages. Furthermore, for educational applications subject matter experts are often required to generate content such as questions and testing materials based on source material such as textbooks. At large scale it is impractical to meet these needs with human effort. As such, automated question generation is a topic of increasing interest in the NLP research literature. Automated question generation has considerable potential for enhancing educational materials such as textbooks for improving student learning outcomes. Research has shown that answering practice questions while reading a textbook has about six times greater learning benefit than reading alone; this is called the "doer effect" (Koedinger et al., 2015, 2016).

Modern question generation (QG) systems can be thought of in two main parts: 1) selecting the content knowledge from the source material that questions will be made from, and then 2) creating the questions from that selected content knowledge. For QG in English, this is feasible because the NLP tools are sufficiently robust and accurate. Implementing a similar QG pipeline in other languages such as Spanish, however, is problematic because the NLP tools for other languages are significantly under-resourced relative to English and, consequently, several capabilities used in QG are usually not nearly as advanced as they are for the English language. For additional languages like Brazilian Portuguese there is yet another large drop in quality of available NLP tools. This means that the operations of content knowledge selection and question creation are not able to be carried out with sufficiently high reliability. As such, it is not practical to build a QG pipeline directly in non-English languages using a similar approach.

Accordingly, what is needed is a way to leverage the capabilities of primary language (e.g., English) NLP which provides advantages for QG over other languages to the maximum extent while dealing with content provided in other languages.

BRIEF SUMMARY

Embodiments of the present disclosure provide apparatuses, systems, and methods for automated QG for documents. Additionally, embodiments of the present disclosure provide parallel construction implementations for QG apparatuses, systems, and methods.

Implementations consistent with the present disclosure may enable creating courseware from textbooks in a library at scale. This type of processing is not practical using human subject matter experts because of the high level of expertise required and the large amount of effort involved. Therefore, apparatuses, systems, and methods described herein were created to use artificial intelligence to perform several of the tasks of courseware creation. One operation in this process is generating questions about the material in the textbook. A sophisticated system has been developed for automatically generating comprehension questions about textbook content using Natural Language Processing (NLP) techniques in a primary language (such as English) selected at least in part upon the type and quality of NLP techniques in the primary language. The system leverages a number of NLP tools to carry out analyses needed for the process, such as part-of-speech tagging, dependency parsing and/or vector space embedding.

To address the obstacles described above implementations consistent with the present disclosure may be configured to leverage the sophistication and accuracy of QG systems using English language text. The present disclosure provides a method for using machine translation (MT) and a parallel corpus approach to enable an English language processing pipeline to be used for QG in other languages as well.

One or more MT services, such as Google Translate or others, may be used to obtain an English language version of a source text for which QG is desired. One method consistent with the present disclosure may use an existing system to generate questions in English from this machine translated version, and then translate those questions back to the source language using a translation tool. However, though we have recently witnessed dramatic advancements in the capabilities of MT systems, this naïve solution is inadequate, because the results of MT can still often be noisy and/or inaccurate (see, for example, Hofstadter, 2018; Wilson, 2019). MT of generated English questions back to the source language could then compound this problem. There are two pertinent categories of MT noise here: First is the accuracy of the translation, e.g., when it does not faithfully convey the meaning of the source language text. Second, even if a translation is accurate in this sense, it often can be inadequate in linguistic quality, e.g., lacking fluency and containing errors in syntax and grammar. Though it is usually possible for a reader with a strong command of the language to infer the intended meaning despite such dysfluencies, both types of noise are unacceptable for educational applications, where accuracy and clarity of communication are of paramount importance to effectiveness.

To overcome these and other problems caused by use of MT, apparatuses, systems, and methods consistent with the present disclosure may implement, in whole or in part, a process called parallel construction. Parallel construction is motivated by parallel corpus methods in NLP, which exploit information contained in representations of the same text in multiple different languages. Parallel corpus-based approaches may be used to address NLP problems such as construction of bilingual dictionaries, cross-language information retrieval, and MT itself. Approaches consistent with the present disclosure may also implement a parallel corpus approach. One concept in parallel corpus methods is alignment. For implementations consistent with the present disclosure, alignment may be performed at the sentence and word levels. This means finding sentences that correspond to each other in the original text and the translated version, and then identifying the corresponding words within those aligned sentences. This is nontrivial, compounded by the fact that sentence and word correspondences are not always one-to-one. Not only can a single word in one language correspond to multiple words in the other, this can happen with sentences as well, for example when MT generates more than one sentence from a single source sentence. In addition, differences in word ordering within corresponding sentences and MT noise add complexity.

Since an English version of the corpus may be created through MT rather than having it provided in embodiments of the present disclosure, sentence alignment can be perfectly achieved by tokenizing the source language corpus into sentences and sending those sentences to the translation service one at a time. Some source sentences will still align to multiple English sentences, since the MT output is sometimes one-to-many, but in that case such an alignment is entirely correct.

It should be noted that the sentence tokenization may be performed in a source language other than English, which may appear at odds with the problem of NLP tools for non-English languages lacking sufficient quality, one of the motivations for various aspects of the present disclosure. To be clear, the problem is not that these tools are unreliable for every necessary task, it is that they are unreliable for several of the more complicated analyses upon which the success of QG depends. Sentence tokenization is an example of a much simpler NLP task that can be carried out in the source language, as is word tokenization. In general, when a tool's performance has been validated empirically, performing some tasks directly in the source language does not constitute a limitation of the method.

The problem of word alignment within aligned sentences remains. A number of different word alignment techniques can successfully be applied in various scenarios. In general, the best alignment methods are often statistically based. In various exemplary embodiments consistent with the present disclosure, the fast_align method (Dyer et al., 2013), an efficient reparameterization of IBM Model 2 for statistical machine translation, may be used, either alone or in combination with one or more other methods. A vector similarity technique, using the distribution of word occurrence counts across the corpus documents in the respective languages might also be employed in various embodiments. An English word vector having high cosine similarity to that of a word in the source language may indicate that the words are more likely to correspond. Probabilistic translation dictionaries learned from the parallel corpus can also play a role in inferring aligned words. The application of word alignment techniques will be illustrated and described herein in greater detail in subsequent examples of the parallel construction method.

Parallel corpus methods enable knowledge about the text in one language to be leveraged for tasks in another language by making use of alignment information. For problems with QG, this may be realized in two important and complementary ways. First, the results of the analysis of the English text by the sophisticated English NLP tools can be applied to QG in the source language as well through the alignment, even though sufficiently powerful NLP tools for the source language do not exist. Second, the alignment information conversely enables a source language version of the English questions to be constructed directly from the original source language text, which was authored by a human subject matter expert and has much higher linguistic quality. This sidesteps the quality issues of MT-generated text that make translation-of-a-translation approaches unacceptable. Therefore, a parallel corpus formulation of QG enables a way to have the best of both worlds by exploiting the relative advantages of each version of the text.

Once an aligned parallel corpus has been constructed, the parallel construction method has very broad range of applicability, as will be seen in the subsequent detailed examples. However, an exemplary overarching strategy of parallel construction is as follows. The English QG system may be operated on the translated text exactly as usual. The system may make step-by-step fine-grained decisions according to the details of its QG algorithms. Each decision may cause at least one specific manipulation to be made to a sample of text being operated upon (which may be a subset of a given corpus or the output of previous manipulation step(s)), and the entire sequence of these decisions and associated manipulations leads from the input English text corpus to the output English questions. In parallel construction, a process may run side-by-side with the English QG. Every time a decision is made and the manipulation resulting from that decision is applied to a sample of English text, the equivalent manipulation may likewise be carried out upon the corresponding source language text using the sentence and word alignments. This way, by the time the English questions are fully developed they are also fully developed in the source language because they are always kept up to date in parallel. Notably, knowledge of the QG decisions are not needed by the parallel construction process, only the manipulations that need to be made in the source language as a result may be used in various exemplary embodiments.

As mentioned earlier, the first step in QG is often selection of content knowledge from which a question will be made. A common example is a single sentence from a textbook, but it could also be a passage consisting of several sentences such as a paragraph, or another type of content altogether, like an entry from a glossary. For ease of illustration, a single sentence may be used for content knowledge examples. The English QG system may make a decision to select the sentence "This is a good sentence for making a question," for transformation into a question. The parallel construction process, given the selected English sentence, then finds the corresponding Spanish sentence "Esta es una buena oracion para hacer una pregunta," in the original text using the sentence alignment information. We thus see how content knowledge selection can be mirrored in Spanish without attempting to replicate the corresponding decision-making logic using source language NLP, which might not be feasible. Instead, knowledge obtained in one language may be applied to facilitate a task in the other language, which is the essence of a parallel corpus approach.

As described herein, parallel implementations of the subsequent text manipulation steps that lead to questions may be ad hoc based at least in part upon the specific QG strategies used. However, just like the above content knowledge selection example, none of the associated decision-making logic is needed. No decisions (content, pedagogical, or otherwise) need to be implemented using NLP on the source language, which again, is often not feasible. Instead, the QG decisions made in English may be used to drive question construction in both languages. How and why these decisions are made are immaterial to parallel construction, thereby enabling very broad application of the method. The entire scope of the parallel construction process may be mirroring the textual manipulations made in English, by applying their appropriately localized equivalents directly to the aligned source language content. This also has the advantage of reusing the knowledge base that is built into the English QG system, which takes considerable effort, expertise, and care to develop.

More formally, QG can be specified as a rule-based expert system that operates on an input text corpus (e.g. a textbook). The system's individual production rules can make the fine-grained decisions of the QG strategies through their applicability conditions and carry out the individual steps of question construction as the resulting productions when those applicability conditions are satisfied. Notably, the applicability conditions may contain all the analysis requiring sophisticated NLP, and the productions themselves in various embodiments (e.g., the content transformations) are much more straightforward by comparison. The parallel construction method may be aware of all the possible productions the rules can make so that those productions can be implemented equivalently (e.g., localized) for the source language. However, parallel construction does not require localization of the production rules themselves; there are no analogous rules for the source language, and thus analogous NLP capabilities for the source language are not required.

It will furthermore be shown in the examples that the linguistic quality of the original source language text is preserved. Although the translated version is used behind the scenes to enable questions to be created in English, the parallel construction approach (as opposed to back-translation) ensures that no translated English text and hence no potential corruption introduced by noisy MT is present in the final source language questions. Instead, questions are directly derived from the original writing of the author.

One advantage of parallel construction is that the implementation details of the English QG system do not matter as long as the process has access to the required textual manipulations that are the results of the decision-making process. As such, parallel construction can be used with essentially any QG method, such as the diverse collection of methodologies described in a recent survey of the state of the art of QG in English (Kurdi et al., 2020). Implementations consistent with the present disclosure in various embodiments may utilize a unique QG system, whose functionality is similar to that of multiple systems discussed in Kurdi et al., 2020, for generating the examples presented and discussed here.

We also note that in the same manner as the questions themselves are constructed, shown in the examples, parallel construction is equally applicable to other related aspects of QG, such as creating feedback for incorrect answers.

According to aspects of the present disclosure, provided is a method of providing parallel construction for question generation (QG) corresponding to a content item. The method includes extracting text of at least a portion of the content item as a source language text having a source language, translating at least a portion of the source language text to generate a parallel text having a primary language different from the source language, aligning the source language text and the primary language text to create an aligned source language text and an aligned primary language text, determining at least one QG strategy, generating at least one step to be performed on the aligned primary language text based at least in part upon the determined at least one QG strategy, constructing at least one parallel operation corresponding to the at least one step to be performed on the aligned primary language text, and generating a source language question based at least in part upon the constructed at least one parallel operation.

A primary language question state and a source language question state may be initialized, each of the primary language question state and the source language question state used to track a status of a transformation of at least one content unit. The method may include tokenizing at least a portion of the source language text into sentences, wherein the translating at least a portion of the source language text to generate the parallel text having a primary language includes translating at least one of the tokenized sentences. The translating at least one of the tokenized sentences may include transmitting the at least one of the tokenized sentences to a translation tool for translation, and obtaining a respective translation of the at least one of the tokenized sentence in the primary language. The method may include tokenizing the at least one of the tokenized sentence and the respective translation of the at least one of the tokenized sentence into content units.

In various embodiments, the content units may be words. The aligning the source language text and the primary language text may include performing word alignment on the content units. The determining at least one QG strategy may include determining a plurality of QG strategies, and further wherein the plurality of QG strategies are looped. Each of the plurality of QG strategies may be applied to a plurality of content units, the plurality of content units corresponding to the content item.

According to further aspects of the present disclosure, provided is a system for providing parallel construction for question generation (QG) corresponding to a content item. The system includes a network and a server having a processor and a memory, the processor configured to execute one or more instructions causing the server to perform the operations of: extracting text of at least a portion of the content item as a source language text having a source language, translating at least a portion of the source language text to generate a parallel text having a primary language different from the source language, aligning the source language text and the primary language text to create an aligned source language text and an aligned primary language text, determining at least one QG strategy, generating at least one step to be performed on the aligned primary language text based at least in part upon the determined at least one QG strategy, constructing at least one parallel operation corresponding to the at least one step to be performed on the aligned primary language text, and generating a source language question based at least in part upon the constructed at least one parallel operation.

The server may include a storage, and further wherein the server is further configured to initialize a primary language question state and a source language question state, each of the primary language question state and the source language question state used to track a status of a transformation of at least one content unit, and to store a representation of the primary language question state and the source language question state at the storage of the server. The server may be configured to tokenize at least a portion of the source language text into sentences, wherein the translating at least a portion of the source language text to generate the parallel text having a primary language includes translating at least one of the tokenized sentences. The server may be configured to translate at least one of the tokenized sentences include transmitting the at least one of the tokenized sentences to a translation tool for translation, and obtaining a respective translation of the at least one of the tokenized sentence in the primary language. The server may tokenize the at least one of the tokenized sentence and the respective translation of the at least one of the tokenized sentence into content units. The server may include a storage, and wherein the content units are words configured to be stored at the storage of the server. The aligning the source language text and the primary language text by the server may include performing word alignment on the content units. The determining at least one QG strategy may include determining a plurality of QG strategies, and further wherein the plurality of QG strategies are looped. The server may apply each of the plurality of QG strategies to a plurality of content units, the plurality of content units corresponding to the content item.

Numerous other objects, features, and advantages of the present disclosure will be readily apparent to those skilled in the art upon a reading of the following disclosure when taken in conjunction with the accompanying drawings.

DETAILED DESCRIPTION

Figure 1:
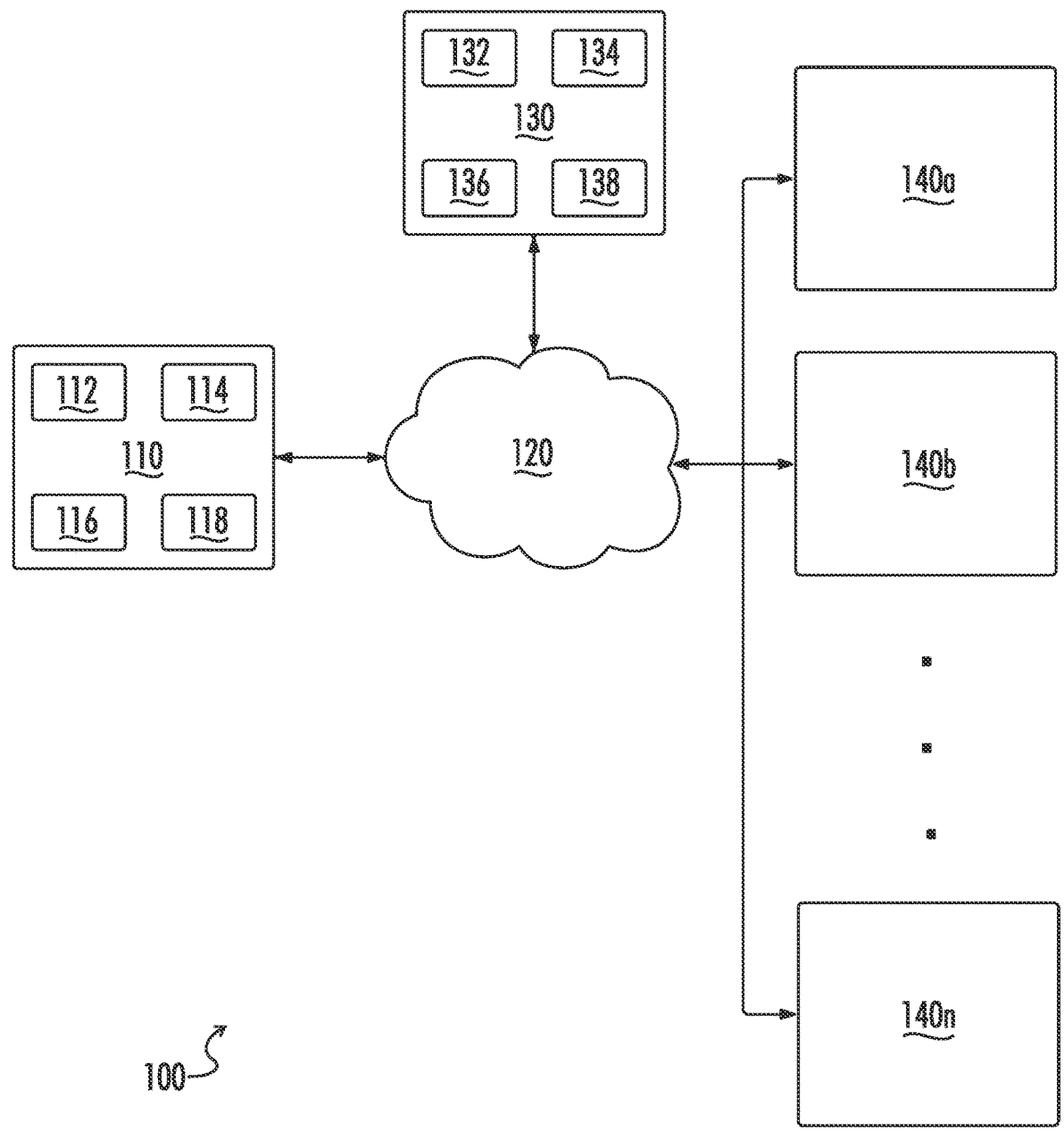
FIG. 1 illustrates an exemplary embodiment of a partial block network diagram according to aspects of the present disclosure.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the implementations consistent with the present disclosure and do not delimit the scope of the present disclosure.

Referring generally to FIGS. 1-9 various exemplary apparatuses, systems, and associated methods according to the present disclosure are described in detail. Of these figures, FIGS. 1-5 may generally reflect aspects of exemplary embodiments of question generation (QG) which are capable of use with one or more aspects of parallel construction and examples of underlying systems for accomplishing aspects of the present disclosure, and FIGS. 6-9 reflect aspects of exemplary embodiments of the present disclosure providing parallel construction implementation and differences and advantages over systems which do not implement parallel construction. As described herein, one or more aspects of the exemplary QG generation embodiments described with reference to FIGS. 1-5 may be used either alone or in combination with one or more aspects of the exemplary embodiments described with reference with FIGS. 6-9 without departing from the spirit and scope of the present disclosure. For example, one or more elements and/or operations associated with FIGS. 1-5 may be implemented, within whole or in part, within one or more elements or operations of FIGS. 6-9. Additionally or alternatively, one or more aspects of the embodiments described with reference to FIGS. 1-5 may be implemented as a standalone implementation, without incorporating any aspect of the features of the embodiments described with reference to FIGS. 6-9. It should be appreciated that one or more operation or function described herein may be performed by a computing device and/or may be performed manually by a user, either in whole or in part. Thus, various implementations consistent with the present disclosure may include scenarios where a human is used to perform one or more operations, such as translation, while other steps may be programmatically implemented.

Where the various figures may describe embodiments sharing various common elements and features with other embodiments, similar elements and features are given the same reference numerals and redundant description thereof may be omitted below.

Various embodiments of an apparatus according to the present disclosure may provide apparatuses, systems, and methods for automated QG for documents. FIG. 1 illustrates an exemplary embodiment of a partial block network diagram according to aspects of the present disclosure. The system 100 is a simplified partial network block diagram reflecting a functional communicative configuration implementable according to aspects of the present disclosure. The system 100 includes a user device 110 coupleable to a network 120, a server 130 coupleable to the network 120, and one or more electronic devices 140*a*, 140*b*, . . . , 140*n* coupleable to the network 120. The server 130 may be a standalone device or in combination with at least one other external component either local or remotely communicatively coupleable with the server 130 (e.g., via the network 120). The server 130 may be configured to store, access, or provide at least a portion of information usable to permit one or more operations described herein. For example, the server 130 may be configured to provide a portal, webpage, interface, and/or downloadable application to a user device 110 to enable one or more operations described herein. The server 130 may additionally or alternatively be configured to store content data and/or metadata to enable one or more operations described herein. The server 130 may optionally be implemented as further described herein with reference to FIG. 4.

In one exemplary embodiment, the network 120 includes the Internet, a public network, a private network, or any other communications medium capable of conveying electronic communications. Connection between elements or components of FIG. 1 may be configured to be performed by wired interface, wireless interface, or combination thereof, without departing from the spirit and the scope of the present disclosure. At least one of the user device 110 and/or the server 130 may include a communication unit 118, 138 configured to permit communications for example via the network 120.

In one exemplary operation, at least one of user device 110 and/or server 130 is configured to store one or more sets of instructions in a volatile and/or non-volatile storage 114, 134. The one or more sets of instructions may be configured to be executed by a microprocessor 112, 132 to perform operations corresponding to the one or more sets of instructions.

In various exemplary embodiments, at least one of the user device 110 and/or server 130 is implemented as at least one of a desktop computer, a server computer, a laptop computer, a smart phone, or any other electronic device capable of executing instructions. The microprocessor 112, 132 may be a generic hardware processor, a special-purpose hardware processor, or a combination thereof. In embodiments having a generic hardware processor (e.g., as a central processing unit (CPU) available from manufacturers such as Intel® and AMD®), the generic hardware processor is configured to be converted to a special-purpose processor by means of being programmed to execute and/or by executing a particular algorithm in the manner discussed herein for providing a specific operation or result. Although described as a microprocessor, it should be appreciated that the microprocessor 112, 132 may be any type of hardware and/or software processor and is not strictly limited to a microprocessor or any operation(s) only capable of execution by a microprocessor.

One or more computing component and/or functional element may be configured to operate remotely and may be further configured to obtain or otherwise operate upon one or more instructions stored physically remote from one or more user device 110, server 130, and/or functional element (e.g., via client-server communications or cloud-based computing).

At least one of the user device 110 and/or server 130 may include a display unit 116, 136. The display unit 116, 136 may be embodied within the computing component or functional element in one embodiment and may be configured to be either wired to or wirelessly interfaced with at least one other computing component or functional element. The display unit 116, 136 may be configured to operate, at least in part, based upon one or more operations of the described herein, as executed by the microprocessor 112, 132.

The one or more electronic devices 140*a*, 140*b*, . . . , 140*n* may be one or more devices configured to store data, operate upon data, and/or perform at least one action described herein. One or more electronic devices 140*a*, 140*b*, . . . , 140*n* may be configured in a distributed manner, such as a distributed computing system, cloud computing system, or the like. At least one electronic device 140 may be configured to perform one or more operations associated with at least one element described herewith with reference to FIG. 4. Additionally or alternatively, one or more electronic device 140 may be structurally and/or functionally equivalent to the server 130. In various embodiments, at least one electronic device 140 may include one or more elements described herein with reference to FIG. 4.

Figure 2A:
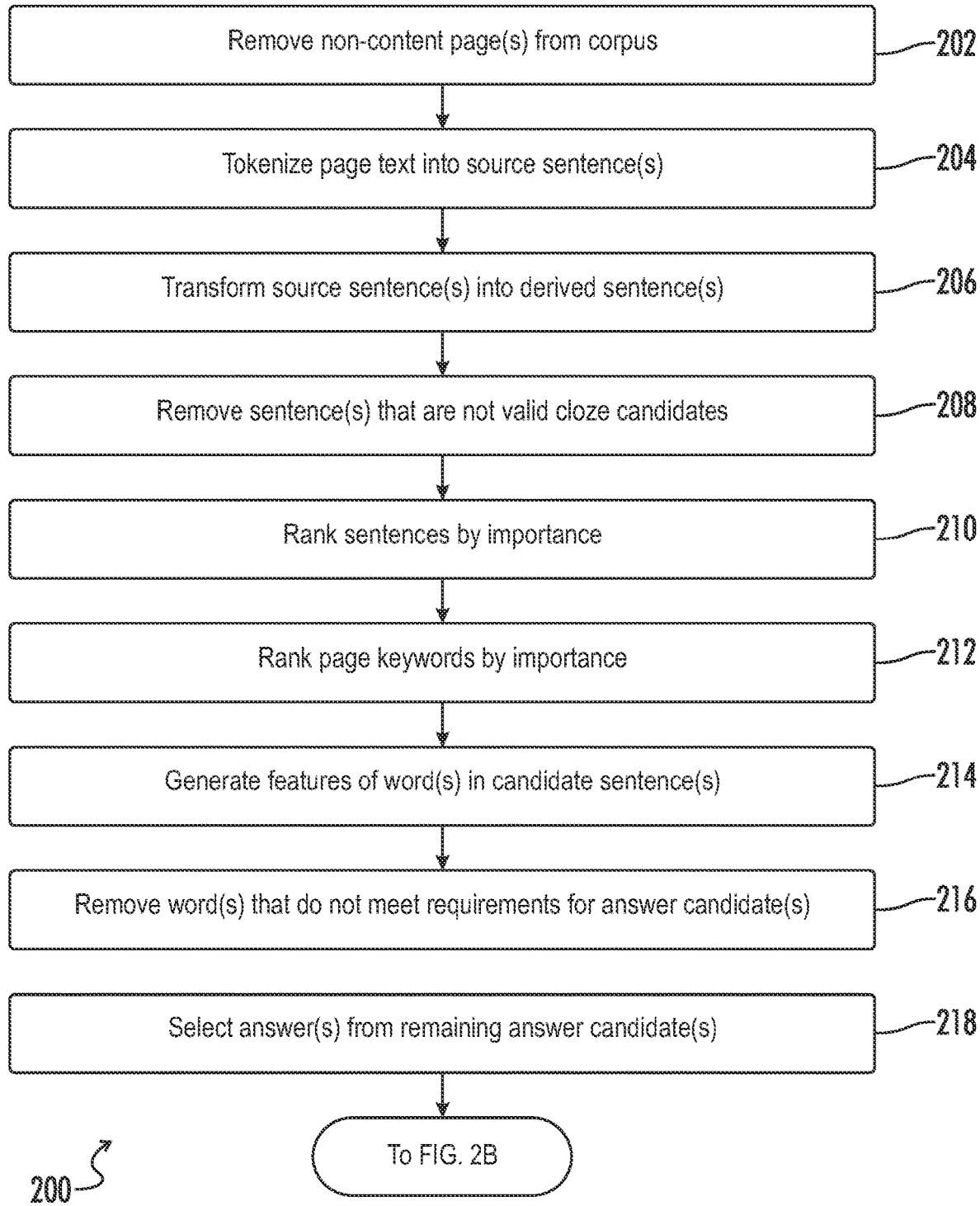
FIGS. 2A and 2B illustrate an exemplary embodiment of a process for generating question candidates from a corpus according to aspects of the present disclosure.
Figure 2B:
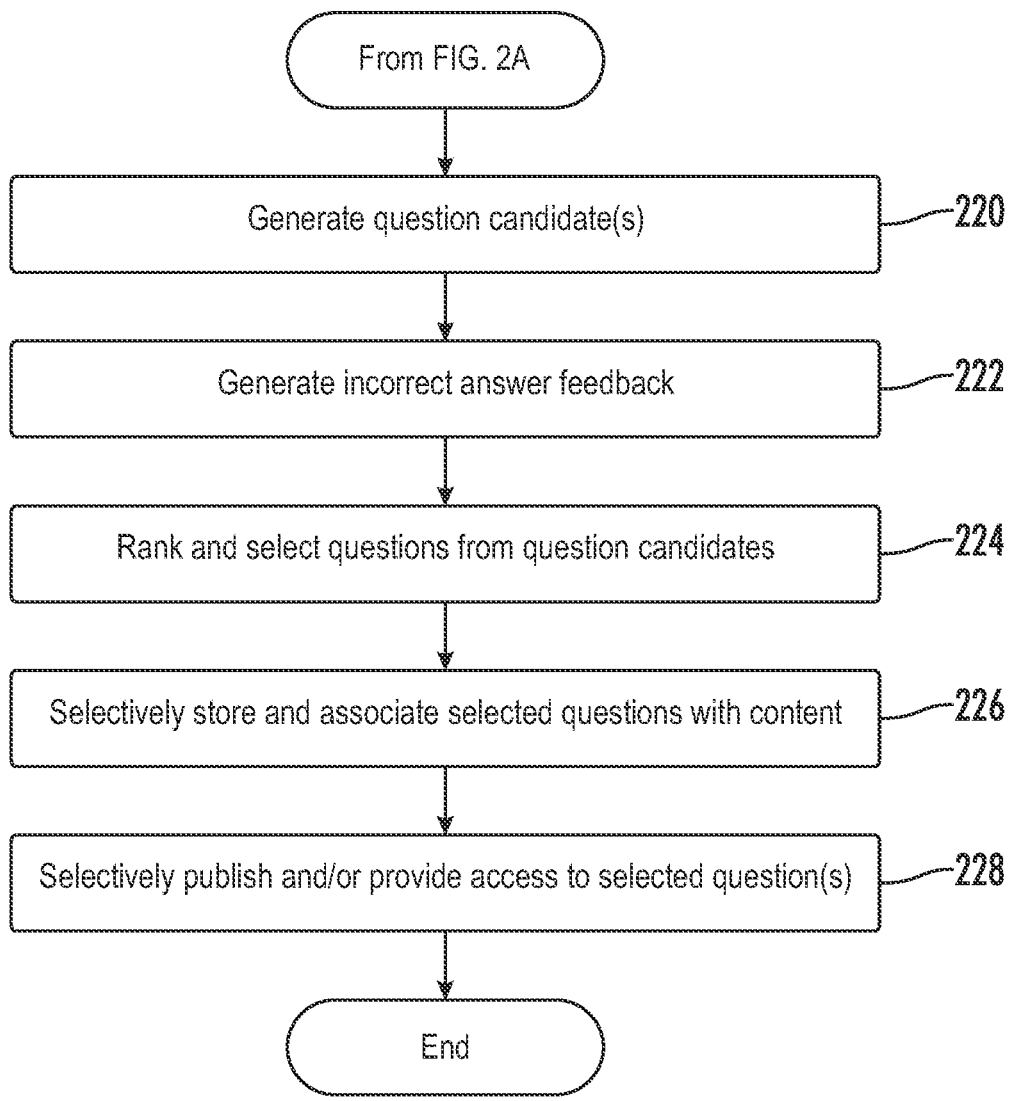

FIG. 2 illustrates an exemplary embodiment of a process for generating question candidates from a corpus according to aspects of the present disclosure. The process 200 is illustrated by the combination of both FIGS. 2A and 2B. One or more operations of the process 200 may be performed by the server 130, the user device 110, one or more electronic device 140*a*, 140*b*, . . . , 140*n*, or combination thereof. The process 200 begins at an operation 202 where one or more non-content page or section thereof is removed from a corpus of text. Examples of non-content pages may include title pages, index pages, bibliographic information pages, image pages, or any other page or portion thereof that is determined to be non-content and/or content not capable of processing according to systems described herein. The corpus of text may be selected by a user or may otherwise by manually and/or automatically selected for processing. At least a portion of a corpus may be received via the network 120. The corpus having the non-content removed may be stored, for example at the storage 134 of the server, at one or more electronic devices 140*a*, 140*b*, . . . , 140*n*, or at any other device or combination thereof. Metadata associated with the content having the non-content may additionally or alternatively be used and may be stored, for example at the storage 134 of the server.

After non-content of the corpus is removed, the process 200 continues to an operation 204 where page text is tokenized into source sentences. The source sentences are then transformed into derived sentences at an operation 206. It may be determined whether one or more sentences are valid (e.g., doze) candidates and sentences that are not valid doze candidates may be removed at an operation 208. Although described as doze candidates it should be appreciated that the one or more candidates may be doze candidates or non-doze candidates without departing from the spirit and scope of the present disclosure. One or more of the operations 202, 204, 206, and/or 208 may be performed by the transform engine 420 described herein with reference to FIG. 4 in various embodiments. As understood in the art, doze candidates may refer to a passage of text having one or more answers embedded within it, including multiple choice, short answer, or other answer which may be provided by an answerer. The doze candidates described herein refer to a complete passage of text, an answer corresponding to the passage of text which may be obscured or removed from the text, or a combination thereof.

After removing the not valid doze candidates, the process may continue to an operation 210 where remaining sentences are ranked by importance. Page keywords may then be ranked by importance at an operation 212. One or more of operations 210 and/or 212 may be performed in whole or in part by the ranking engine 430 described herein with reference to FIG. 4. The process 200 then continues to an operation 214 where features of works in candidate sentences are generated. One or more words that do not meet the requirements for an answer candidate are then removed at an operation 216. Answers may then be selected from remaining answer candidates at an operation 218. The process 200 may then continue to operation 220 of FIG. 2B, where one or more question candidates are generated. Incorrect answer feedback may be generated at an operation 222. Questions may then be ranked and selected from the remaining question candidates at an operation 224. The selected questions may be selectively stored and associated with the content of the corpus at an operation 226. The process 200 then continues to an operation 228 where selected questions are selectively published and/or access is provided to the selected questions and the process 200 ends. One or more of the operations 214-228 may be implemented in whole or in part by the candidate engine 440 described herein with reference to FIG. 4.

Figure 3A:
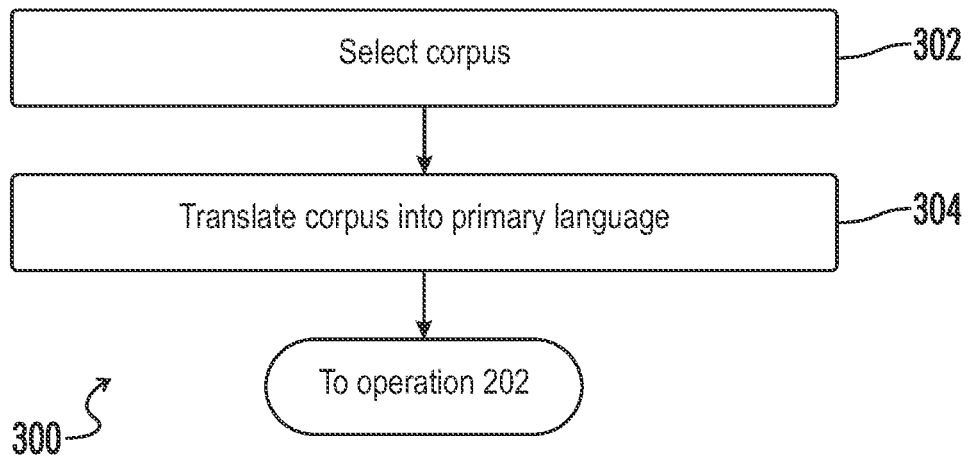
FIG. 3A illustrates an exemplary embodiment of a corpus translation process performed prior to the process illustrated by FIGS. 2A and 2B according to aspects of the present disclosure.

FIG. 3A illustrates an exemplary embodiment of a corpus translation process performed prior to the process illustrated by FIGS. 2A and 2B according to aspects of the present disclosure. At least one operation of the process 300 may be performed in whole or in part by the translation engine 410. The process 300 begins at an operation 302 where a corpus is selected. The corpus may be selected manually by a user, automatically by the system, or combination thereof. The corpus may selected from a group of possible selectable corpora, for example stored by at least one of server 130, at least one electronic device 140*a*, 140*b*, . . . , 140*n*, user device 110, or combination thereof. Additionally or alternatively, a corpus may be selected from one or more third-party locations, such as network-accessible device via the network 120. The process 300 continues to an operation 204 where the corpus is translated into a primary language from an original (source) language of the corpus. The primary language may be any language capable of translation. In various exemplary embodiments, the primary language may be selected based at least in part upon one or more Natural Language Processing (NLP) advantages associated with the language. For example, the English language is currently capable of more robust NLP implementation. However, over time one or more advantages associated with use of the English language for NLP may be matched or surpassed by one or more other languages, at which time such language(s) may be selectively implemented according to one or more characteristics. After processing at operation 304 the process continues to operation 202 illustrated and described with reference to FIG. 2.

Figure 3B:
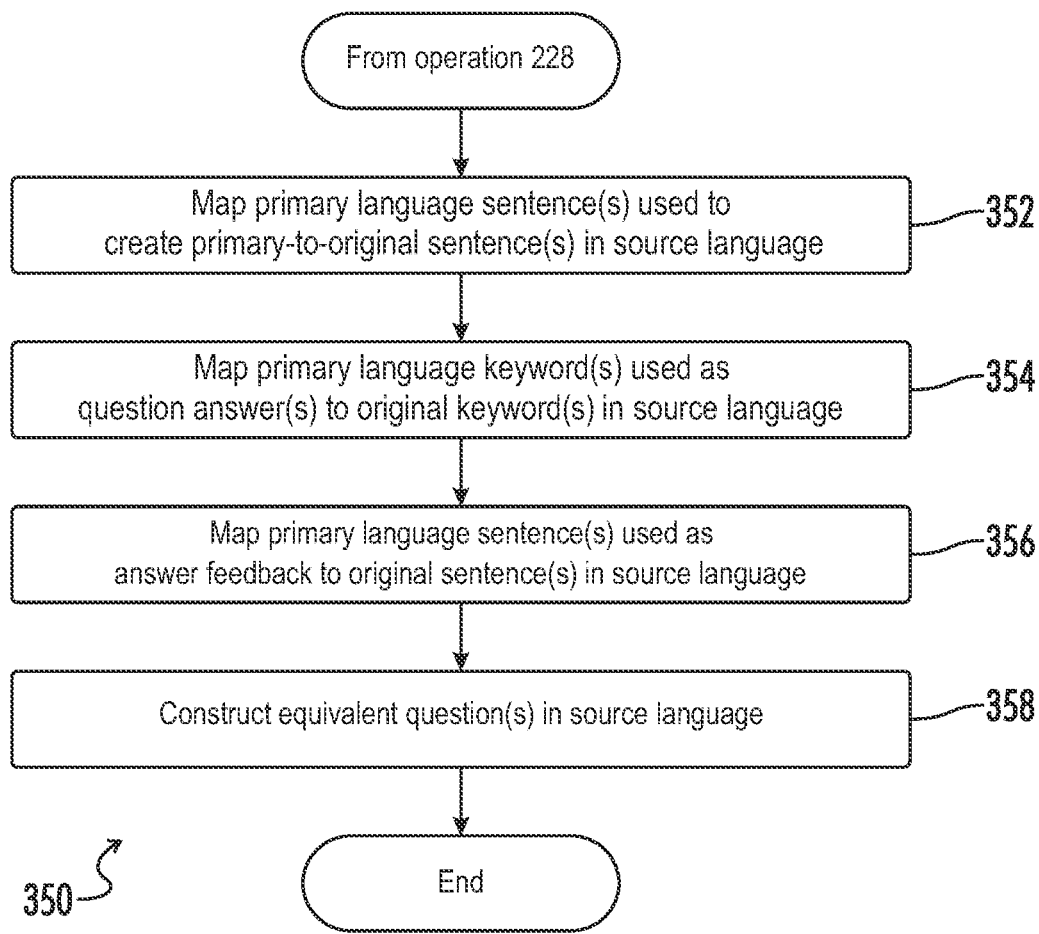
FIG. 3B illustrates an exemplary embodiment of a primary language mapping process implementable in conjunction with the process of FIGS. 2A and 2B according to aspects of the present disclosure.

FIG. 3B illustrates an exemplary embodiment of a primary language mapping process implementable with the process of FIG. 2 according to aspects of the present disclosure. The process 350 continues from operation 228 of FIG. 2 at an operation 352 where primary language sentence(s) used to create primary-to-original sentence(s) are mapped to a source language. The process 350 then continues to an operation 354 where primary language keyword(s) used as questions answer(s) to original keyword(s) in a source language are mapped. Primary language sentence(s) used as answer feedback to original sentence(s) in the source language are then mapped at an operation 356. Equivalent question(s) are then constructed in the source language at an operation 358 and the process 350 then ends. At least one of operation of process 350 may be performed in whole or in part by the mapping engine 450.

Figure 4:
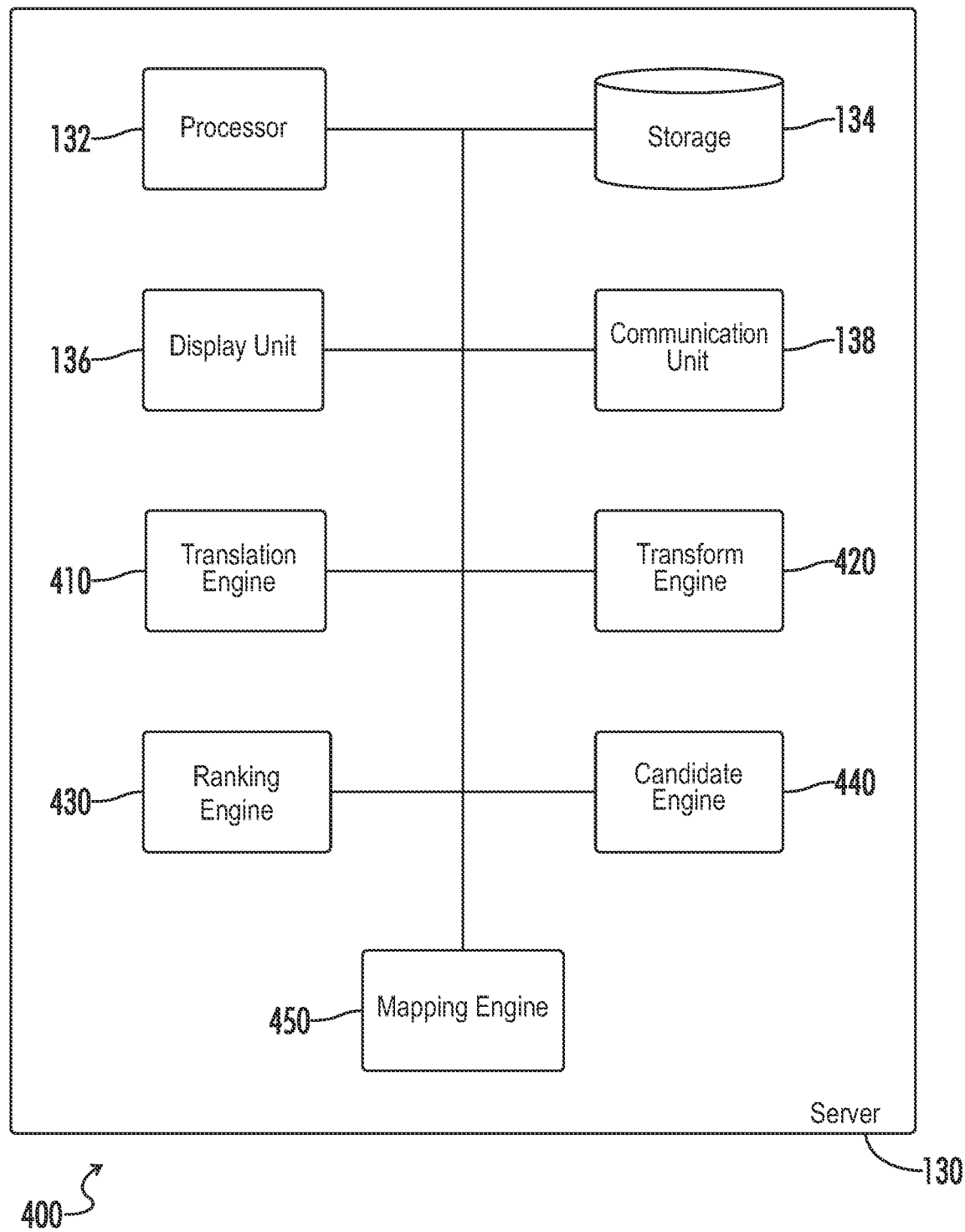
FIG. 4 illustrates an exemplary embodiment of a partial block diagram of a server according to aspects of the present disclosure.

FIG. 4 illustrates an exemplary embodiment of a partial block diagram of a server according to aspects of the present disclosure. The server 130 of FIG. 4 includes one or more of a microprocessor 132, a storage 134, a display unit 136, a communication unit 138, a translation engine 410, a transform engine 420, a ranking engine 430, a candidate engine 440, and/or a mapping engine 450. Although illustrated as being physically embodied within the server 130 it should be appreciated that one or more physical elements and/or operations corresponding to at least one of the translation engine 410, transform engine 420, ranking engine 430, candidate engine 440, and/or mapping engine 450 may be physically and/or logically remote from the server 130 and may be communicatively coupleable thereto, for example via the network 120.

Figure 5:
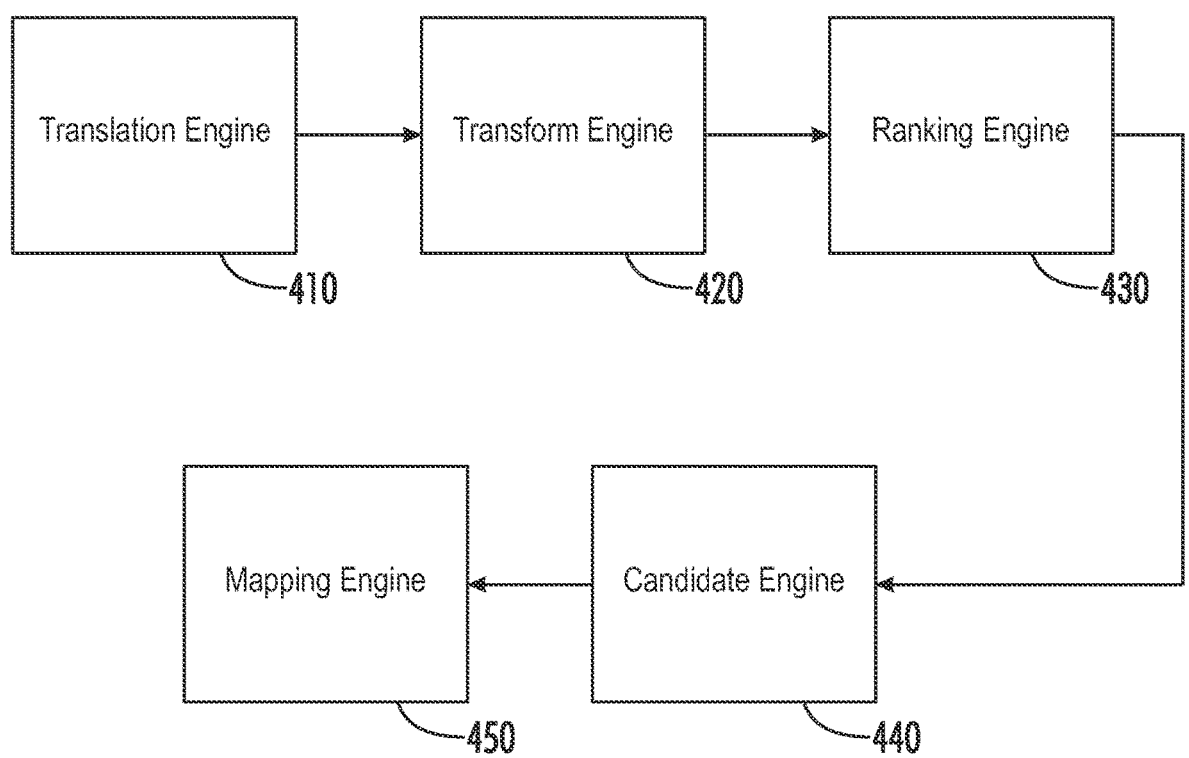
FIG. 5 illustrates an exemplary embodiment of a partial block flow diagram of processing according to aspects of the present disclosure.

FIG. 5 illustrates an exemplary embodiment of a partial block flow diagram of processing according to aspects of the present disclosure. As functionally illustrated by FIG. 5, an output of the translation engine 410 may be provided to the transform engine, which may perform at least one operation on input thereto and provide output to the ranking engine 430. The ranking engine may perform at least one operation and provide input to the candidate engine 440. An output of the candidate engine 440 may be provided as input to the mapping engine 450 which is configured to perform at least one mapping operation.

Although described herewith with reference to a primary language being English, it should be appreciated that although English language NLP tools are used, these NLP tools are currently used because the English language applications of these tools are currently the best compared to other languages. In principle, implementations consistent with the present disclosure may work with any two languages given sufficient NLP capabilities.

Furthermore, while the operations of translation, QG and reconstruction of questions in the original (source) language are performed using software-based implementations, one or more of these operations may be carried out by a human in whole or in part. For example, implementations consistent with the present disclosure may include MT of a non-English language corpus to English, automated QG in English, and then a human manually reconstructing the questions in another, non-English language. While not as efficient as full automation, such a solution may solve the aspects of problems addressed by the present disclosure and may be a significant step forward over a fully manual process.

The following provides an exemplary scenario consistent with the present disclosure. It should be appreciated that one or more of the below operations performed by a human may additionally or alternatively be implemented in whole or in part by at least one computer-implemented element, for example in the manner and using the structure described herein. For example one or more operations illustrated by and described with reference to FIGS. 2-3 and/or one or more engines illustrated by FIGS. 4-5 may be used to perform one or more actions described below in addition to or in place of the named actors. Suppose a textbook is provided about a given subject (e.g. economics), that is written in Spanish, and that questions about the material in the textbook are to be generated for the purpose of helping students learn the material. A professor may be available who is a subject matter expert in the topic of the textbook and is capable of creating such questions, but the professor does not speak Spanish, only English. The professor might have access to an assistant or other person who speaks both Spanish and English and can translate between them, but who knows nothing about economics or an insufficient amount to be considered a subject matter expert or to be able to generate useful questions based on the textbook. In principle, the assistant or other person could translate the textbook into English, the professor could create questions in English, and then the assistant could translate those questions back into Spanish. But suppose the assistant's translation skills are adequate but far from perfect, such that the translations are not always highly accurate. Since the professor understands economics, he or she might be able to make out the meaning even when the translation is not up to par and may be enabled to write questions about the material anyway. The professor might not bother trying to "clean up" the English translation because the goal is creating questions in Spanish, and he knows the assistant is not always able to translate English back to Spanish sufficiently accurately anyway. To compensate for this, a different approach might be taken.

For each question the professor writes, he or she might keep track of the material in the English translation that was selected to ask about (for example, a particularly important sentence or two), and may use a step-by-step process detailing how that selected content knowledge is transformed into a question (and optionally also the answer to the question, feedback that can be given for incorrect answers, etc., when applicable). This may include keeping a record of the "building blocks" selected from the English text for creating a question (e.g., the specific keywords, phrases and clauses that went into it). For example, the professor may decide to replace a particularly important term in a sentence with a blank that the student must fill in, or may identify an important concept and ask the student to explain it (e.g., "Why is [concept] important?"). In other words, the professor might effectively use a set of templates for making questions about the important content he identifies.

The assistant or other person may then match the professor's selected English content and associated question building blocks in the original Spanish textbook. Since the assistant performed the translation, he or she is easily able to identify these, especially since the professor does not modify the English translation when creating the questions. Note, however, that in this example the assistant does not make any of the decisions about the content knowledge selected for QG or any decisions about how the selected content knowledge is transformed into questions. Those decisions are made exclusively by the professor, and it is not necessary for the assistant to be aware of them to do their part. The assistant may then construct the question in Spanish simply by carrying out the Spanish equivalent of each step in the professor's template. These may be simple lexical, syntactic, and grammatical transformations, and do not require any knowledge of the subject domain of economics or any pedagogical knowledge of how to construct useful questions about the material. This is much easier for the assistant to do with fidelity than translating the professor's English questions into Spanish. In this way, the professor and the assistant can collaborate effectively to produce questions in Spanish that have high quality not only from a content and pedagogical perspective, but also in terms of Spanish linguistic quality, rather than merely being a translation of a translation.

This is accomplished despite the professor knowing no Spanish and the assistant's translation skills being merely adequate. The professor, as the expert in economics, makes all the decisions about what content in the (translated) textbook is important to ask about and how to create the questions from it, and the assistant uses the instantiated templates provided by the professor as a detailed blueprint for constructing the equivalent questions in Spanish from the original textbook material.

In summary, a translation assistant may create a translation of a textbook to English that is workable, but not production quality. The subject matter expert (SME) (e.g., the professor in the above example) may locate important English content knowledge (e.g., one or more sentences). The SME constructs English language questions from the content and also provides the step-by-step templates used to create the questions. For each step in the template, the assistant locates the corresponding Spanish content in the textbook and applies the Spanish equivalent of the template steps to it to construct the corresponding questions in Spanish. The entire scope of the assistant's task may thus be to mirror the SME's steps in Spanish.

Although economics was used as the example of the subject domain in the above examples, any subject may be used within the scope of the present disclosure. Although Spanish and English were used as the examples of the original (source) and intermediate (primary) languages, these could be any two languages within the scope of the present disclosure. Although in the previous scenario the expert "professor" and the translation assistant are humans, they do not have to be. One or both could be software systems of the type and structure described herein without departing from the spirit and scope of the present disclosure.

Implementations consistent with the present disclosure may provide a portal or webpage (e.g., via the server 130 and/or electronic device(s) 140) to enable a user such as a subject matter expert, a student, or other user to access one or more features of the present disclosure. For example, a subject matter expert may log into the portal or webpage and be provided with the ability to create one or more questions associated with content, to select one or more parameters associated with questions or content (e.g., regarding specific language-based questions or criteria associated with the content or questions in a language known to the subject matter expert), to review questions generated by the subject matter expert or created by another or by the system based at least in part upon the one or more parameters selected by the subject matter expert, to perform the creation or review of answer data associated with one or more questions, to view or edit answers to questions presented to other users, etc. A student may be log into the portal or webpage to be provided with questions and to provide answers to the questions. An assistant or other user may log into the portal or webpage and may perform operations including translation of content and/or question or answer material, QG, answer creation, answer verification, or to perform any other operation to assist the system described herein in accordance with the previous discussion.

FIGS. 6-9 represent aspects of exemplary embodiments of the present disclosure to illustrate providing parallel construction and differences between parallel construction and generic QG implementation.

Figure 6:
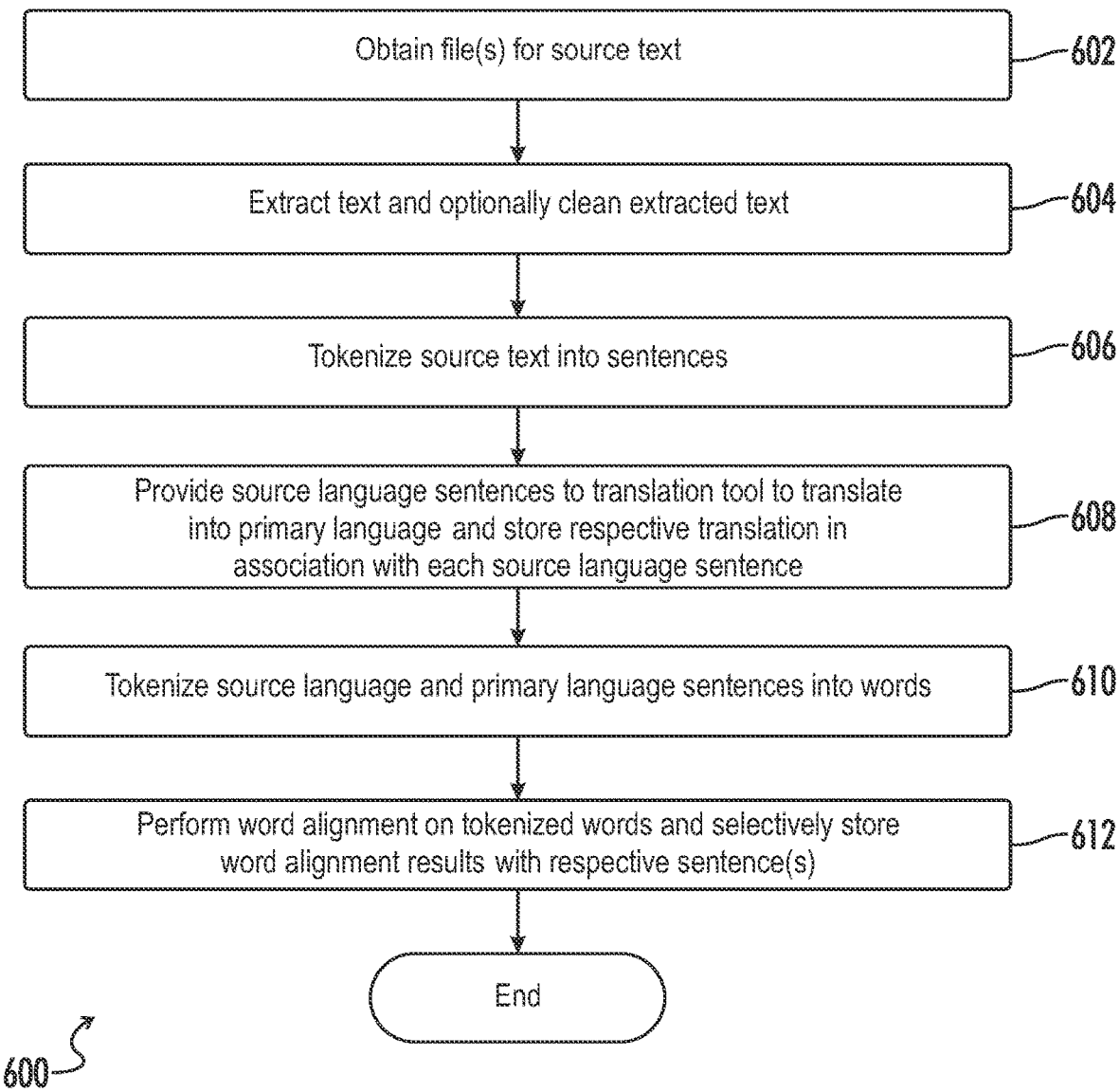
FIG. 6 illustrates an exemplary embodiment of a parallel corpus generation process according to aspects of the present disclosure.

FIG. 6 illustrates an exemplary embodiment of a parallel corpus generation process according to aspects of the present disclosure. The process 600 of FIG. 6 may enable one or more parallel construction operations to occur as described herein, for example, as the process may configure one or more sets of source material or data into a format and/or type for performing parallel construction as described herein. The process 600 begins at an operation 602 where one or more files is obtained, the one or more files containing source text. Although described as a file, it should be appreciated that a file may include any set of information, either as a single document (e.g., in a format such as HTML data, a .PDF file, or the like), a subpart thereof, or any other set of data, information, and/or metadata without departing from the spirit and scope of the present disclosure. In various embodiments, at least one file may be retrieved from a remote location, such as via the network 120. For example, one or more data files such as raw data files including source data may be obtained via a network or Internet connection (e.g., via network 120).

After obtaining the one or more files, the process continues to an operation 604 where raw text is extracted from at least one file and at least a portion of the raw text is optionally cleaned. Raw text may be extracted ad hoc based at least in part upon a source file format and may be represented in a standardized internal format (e.g., that may be used for all or a portion of further processing). At least a portion of raw text may optionally be cleaned at operation 604. Text cleaning may include removing text (if any) that is deemed not germane to question generation or is otherwise not desired for inclusion in the corpus. Such text might include the book's table of contents, index, references, etc. In various embodiments, no text cleaning might optionally be performed.

The process next continues to an operation 606 where source text is tokenized into one or more sentences. At least one portion of operation 606 may be performed in the source language in various embodiments and may optionally be performed entirely in the source language. Tokenization in a source language may be used for its reliability, as described herein. After tokenization at operation 606, the process 600 continues to operation 608 where one or more source language sentences are provided to a translation tool to translate into a primary language. The operation 608 may optionally include storing at least one respective translation associated with at least one source language sentence. In various embodiments, each source language sentence may be associated with at least one respective translation. In this way the corpus is aligned with perfect accuracy at the sentence level. A sentence-aligned parallel corpus may accordingly be generated at operation 608. One or more MT providers may be used at operation 608, for example Google Translate as the translation tool, but any suitable machine translation tool may be used without departing from the spirit and scope of the present disclosure. The translation tool may be accessed, for example, via the network 120 in various embodiments.

At an operation 610 the source language and primary language sentences are tokenized into one or more sets of words. Tokenization at operation 610 may be similar to the tokenization described above with reference to operation 604, albeit at a word—rather than sentence-level, and with two sets of data to be tokenized, both in the source language and in the primary language. The process then continues to an operation 612 where at least one word alignment operation may be performed on tokenized words. A word alignment operation, such as a fast align third-party tool previously described may be used, although implementations consistent with the present disclosure are not limited to such, as any suitable tool or algorithm may be used without departing from the spirit and scope of the present disclosure. One or more word alignment results may be optionally stored and may optionally be associated with one or more respective sentences. The results of operation 612 may include a desired parallel corpus aligned at the sentence and word levels. Such aligned parallel corpus may be configured in a format capable of use with at least one parallel construction operation described herein.

Figure 7:
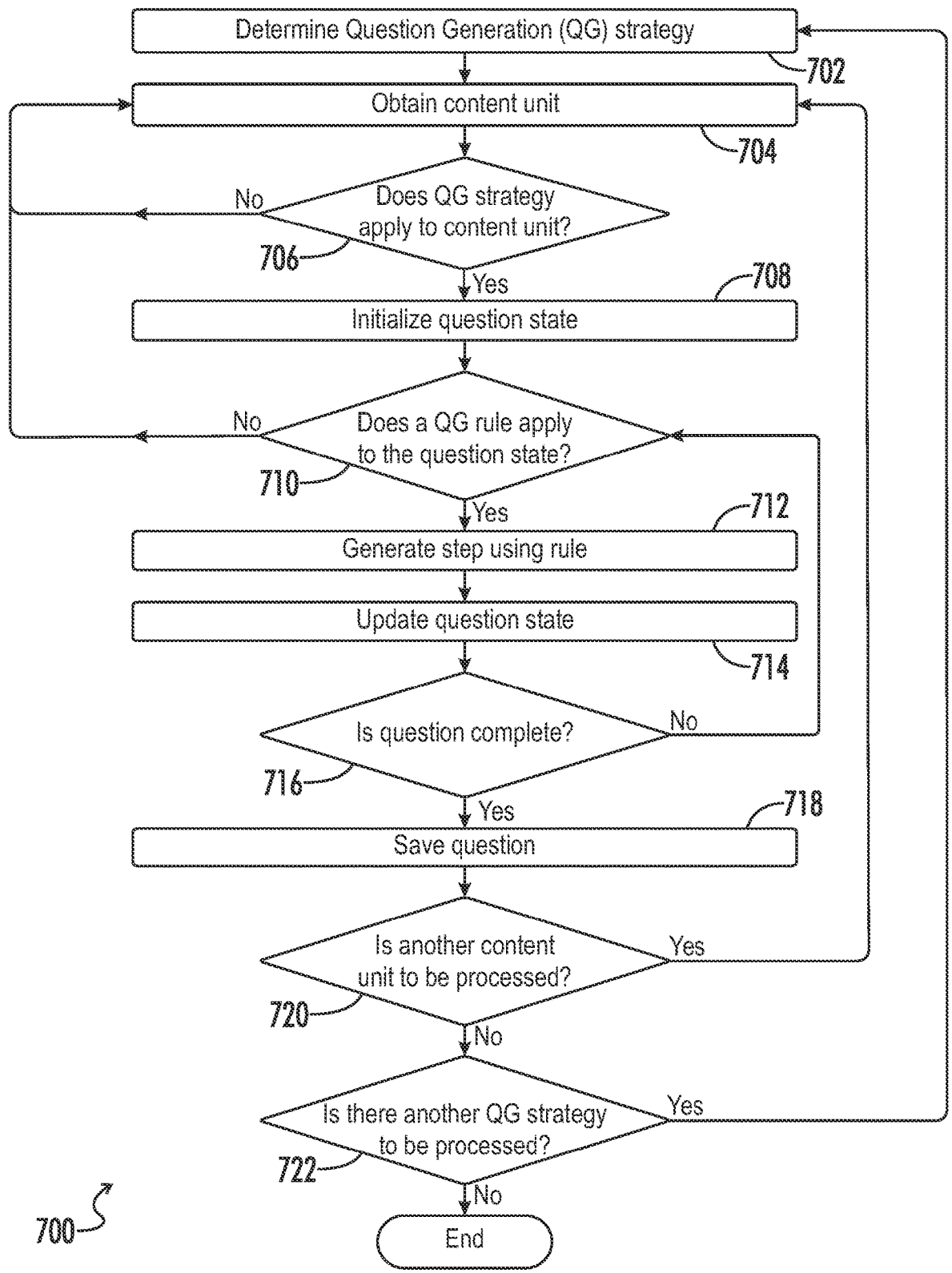
FIG. 7 illustrates a flowchart representing an exemplary embodiment of performing Question Generation (QG) without performing parallel construction according to aspects of the present disclosure.

FIG. 7 illustrates a flowchart representing an exemplary embodiment of performing Question Generation (QG) without performing parallel construction according to aspects of the present disclosure. The process 700 begins at an operation 702 where a QG strategy is determined. One or more QG strategies may be applied to a content unit, thus the QG strategy determination may be iteratively processed in a loop, as illustrated and described. The process 700 continues to an operation 704 where a content unit is obtained. The content unit may be a portion of raw or processed data in various embodiments. A content unit may be any set or subset of input content selected for QG. Different QG strategies may use different types of content units as a starting point, for example a sentence, multiple sentences, or a key term. For this reason, the content unit loop is inside the QG strategy determination of operation 702, and only the content units that are appropriate for the current strategy may be considered in various embodiments.

The process 700 include an operation 706 where it is determined whether the current QG strategy applies to the unit of content. If not, the process returns to operation 704 to obtain a next item of content, is such item of content exists. If it is determined that the current QG strategy applies to the unit of content, the process continues to an operation 708 where a question state is initialized. The question state may keep track of the status of the transformation of the selected content unit to a question, including saving intermediate results that are needed across steps when necessary. It is then determined at an operation 710 whether a QG rule applies to the question state. If not, the process returns to operation 704. If it is, however, determined that a QG rule applies to the content unit, the process continues to an operation 712 where a question generation step is performed based at least in part upon the QG rule. The process then continues to an operation 714 where the question state is updated.

It is determined at an operation 716 whether the question is complete. A final (goal) state may be used to indicate when the question is completed, for example based at least in part upon the updated question state at operation 714. If a QG strategy cannot be completed for a content unit, the attempt to generate a question from the content unit may simply be aborted. If it is determined that the question is complete at operation 716, the question may be saved at operation 718. It may be determined at an operation 720 whether there is another content item to be processed. If so, the process may return to operation 704. If no other content item is to be processed, it may be determined at an operation 722 whether there is another QG strategy to process. If so, the process may return to operation 702. If it is determined that no other QG strategy is to be processed, the process 700 may end.

Figure 8A:
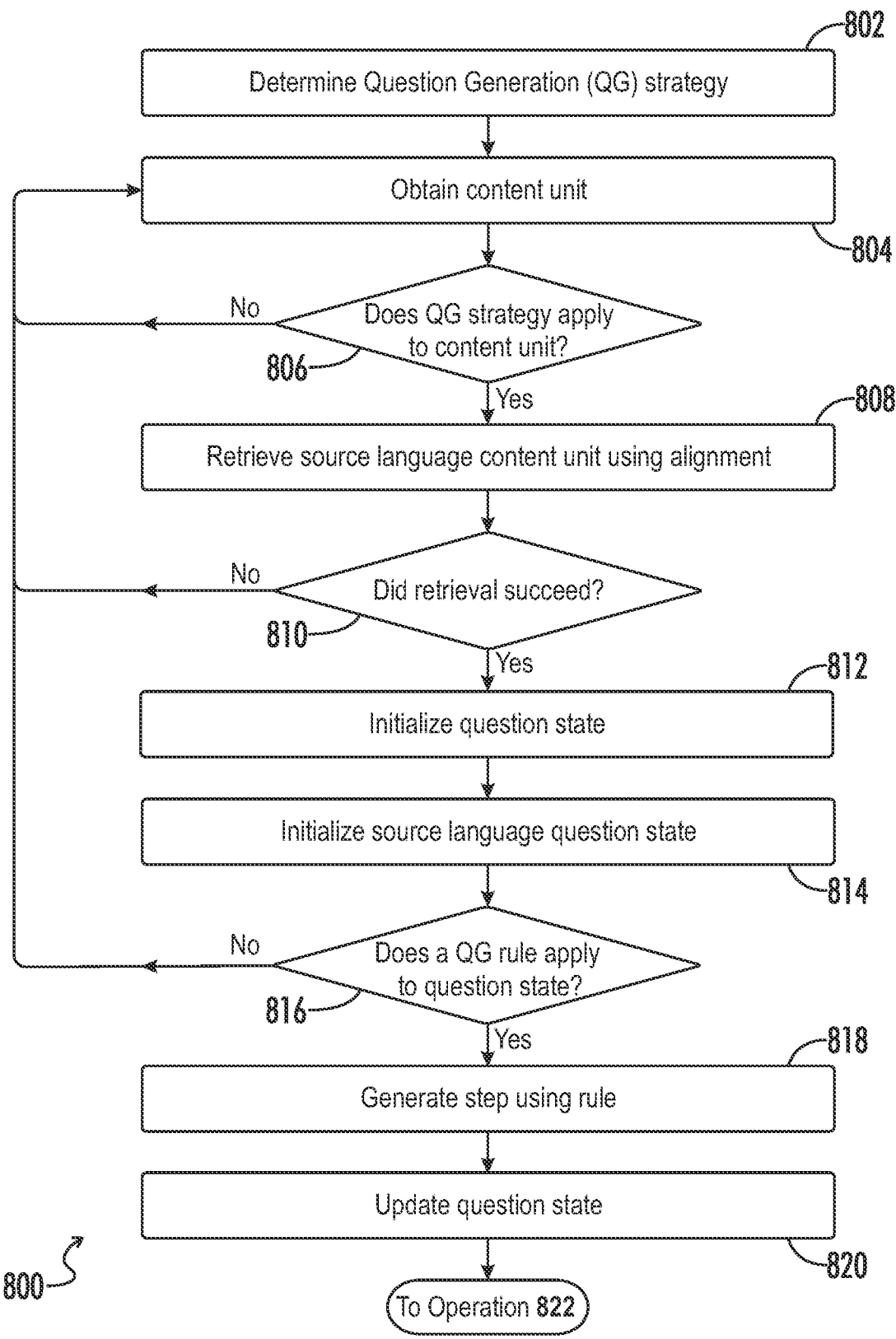
FIGS. 8A and 8B collectively illustrate a flowchart representing an exemplary embodiment of performing Question Generation (QG) including performing parallel construction according to aspects of the present disclosure.
Figure 8B:
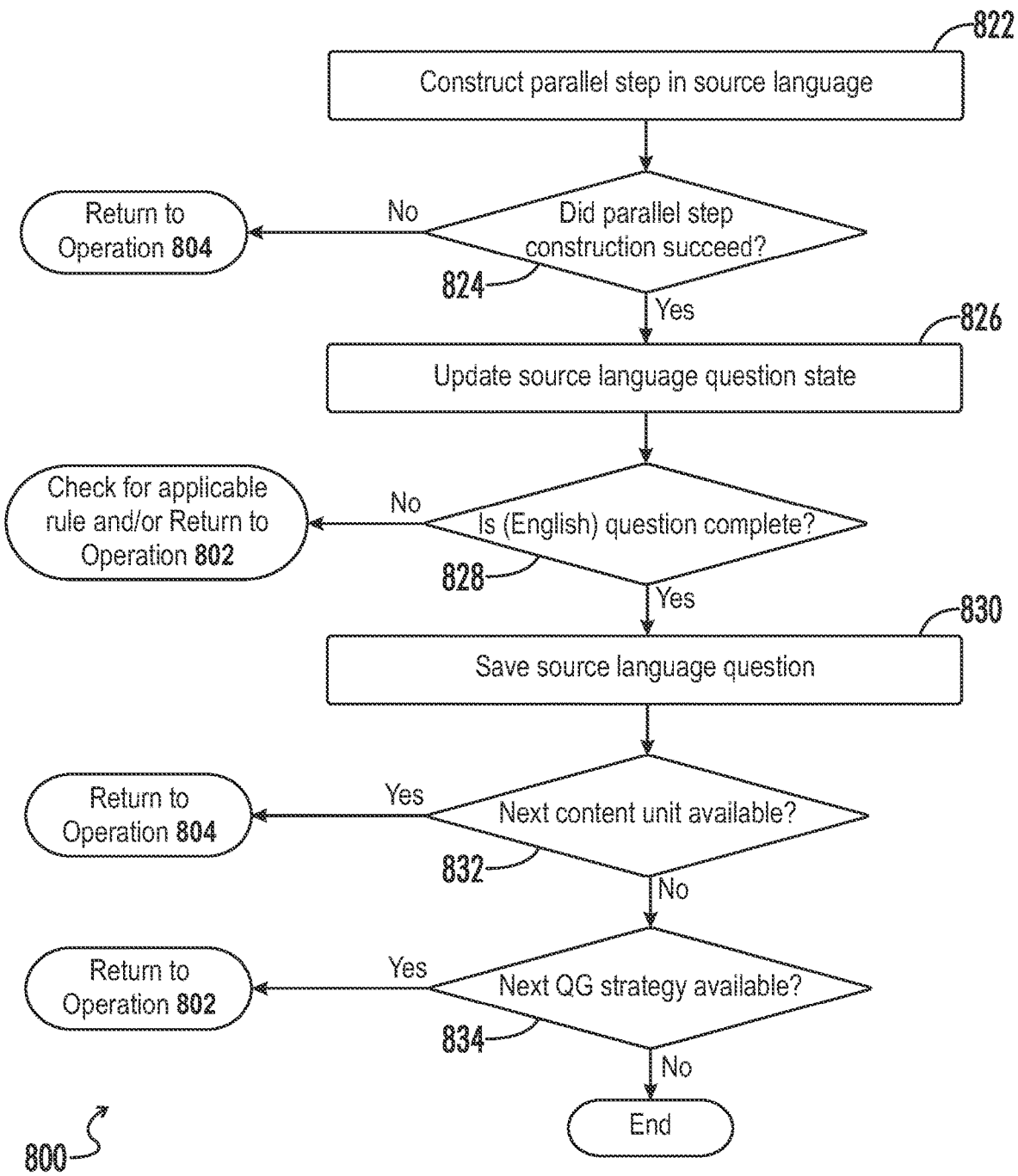

FIGS. 8A and 8B collectively illustrate a flowchart representing an exemplary embodiment of performing Question Generation (QG) including performing parallel construction according to aspects of the present disclosure. As previously described herein, the process of parallel construction may include operations and capabilities beyond traditional QG. For example, the parallel construction embodiment illustrated by FIG. 8 includes multiple similar or identical operations compared to non-parallel construction QG illustrated by FIG. 7, along with further operations configured to enable performing alignment similar to as described with reference to FIG. 6 above, and to implement source and primary language parallel operations to perform QG. Understandably, implementing parallel construction in the manner described herein provides numerous technical advantages over traditional QG, and leverages such technology to address numerous technological problems in the field of invention (e.g., as described above).

The process 800 begins at an operation 802 where a QG strategy is determined. Similar to as described above with reference to operation 702 of FIG. 7, one or more QG strategies may be applied to a content unit, thus the QG strategy determination may be iteratively processed in a loop, as illustrated and described. The process 800 continues to an operation 804 where a content unit is obtained. The content unit may be a portion of raw or processed data in various embodiments. A content unit may be any set or subset of input content selected for QG. Different QG strategies may use different types of content units as a starting point, for example a sentence, multiple sentences, or a key term. For this reason, the content unit loop is inside the QG strategy determination of operation 802, and only the content units that are appropriate for the current strategy might be considered in various embodiments.

It is determined at an operation 806 whether the QG strategy applies to the current content unit. If not, the process returns to operation 804. If so, the process continues to an operation 808 where source language content is retrieved using alignment. The alignment performed at operation 808 may include one or more steps or operations illustrated and described with reference to process 600 of FIG. 6. The process 800 then continues to an operation 810 where it is determined whether retrieval at operation 808 was a success. If not, the process returns to operation 802. If so, the process continues to an operation 812 where question state is initialized. As describe above with reference to operation 708 of FIG. 7, the question state may keep track of the status of the transformation of the selected content unit to a question, including saving intermediate results that are needed across steps when necessary. The process then continues to an operation 814 where a source language question state is initialized. Similar to the question state initialized at operation 812, the source language question state may keep track of the status of the transformation of a selected content unit to a question, including saving intermediate results that are needed across steps when necessary.

It is then determined at an operation 816 whether a QG rule applies to the question state (and/or selectively additionally or alternatively to the source language question state in various embodiments). If not, the process returns to operation 804. If it is, however, determined that a QG rule applies to the content unit, the process continues to an operation 818 where a question generation step is performed based at least in part upon the QG rule and at least one of the question state and/or source language question state. The process then continues to an operation 820 where the question state is updated.

The process 800 continues to an operation 822 where at least one parallel step in the source language is constructed. The at least one parallel step may be configured to correspond to a same or substantially similar operation or step performed upon a primary language equivalent in various embodiments. This may be accomplished using, at least in part, one or more results of alignment between the source language corpus and the primary language corpus. One or more parallel construction steps might not success for a reason such as an alignment failure for necessary words. When this happens, the QG attempt may be simply discarded in various embodiments.

It is determined at an operation 824 whether the parallel step construction was successful. If not, the process returns to operation 804. If so, the process continues to an operation 826 where the source language question state is updated. A source language question state may be maintained in parallel to the primary language question state to keep track of intermediate source language results as needed. It is determined at an operation 828 whether a primary language (e.g., English) question is complete. If not, the process may continue by checking for an applicable rule and/or may return to operation 802. If so, the process continues to an operation 830 where the source language is saved. When the primary language question state reaches the final (goal) state, the corresponding question in the source language will also be complete according to the present disclosure. It is then determined at an operation 832 whether a next content unit is available. If so, the process returns to operation 804. If not, the process continues to an operation 834 where it is determined whether a next QG strategy is available. If so, the process returns to operation 802. If not, the process ends for the source content.

The process illustrated by FIG. 8 may be used to implement a process of parallel construction between source language content and primary language content. Using parallel construction, one or more QG steps performed in a primary language (such one or more operations performed in English as the primary language) may be reconstructed in a source language, whereby corresponding parallel corpora of content of the source language content and primary language content may be used via alignment of the source language and primary language texts. Unlike existing systems, implementations consistent with the present disclosure may align parallel texts corresponding to one another in both the source language and the primary language. Performing alignment in the described manner is capable of reducing or eliminating many translation issues which might arise, for example, when a source language document is first translated to a primary language for processing in the primary language before being translated back to the source language. The below examples provide real-world descriptions of such issues in the context of the present disclosure.

Figure 9:
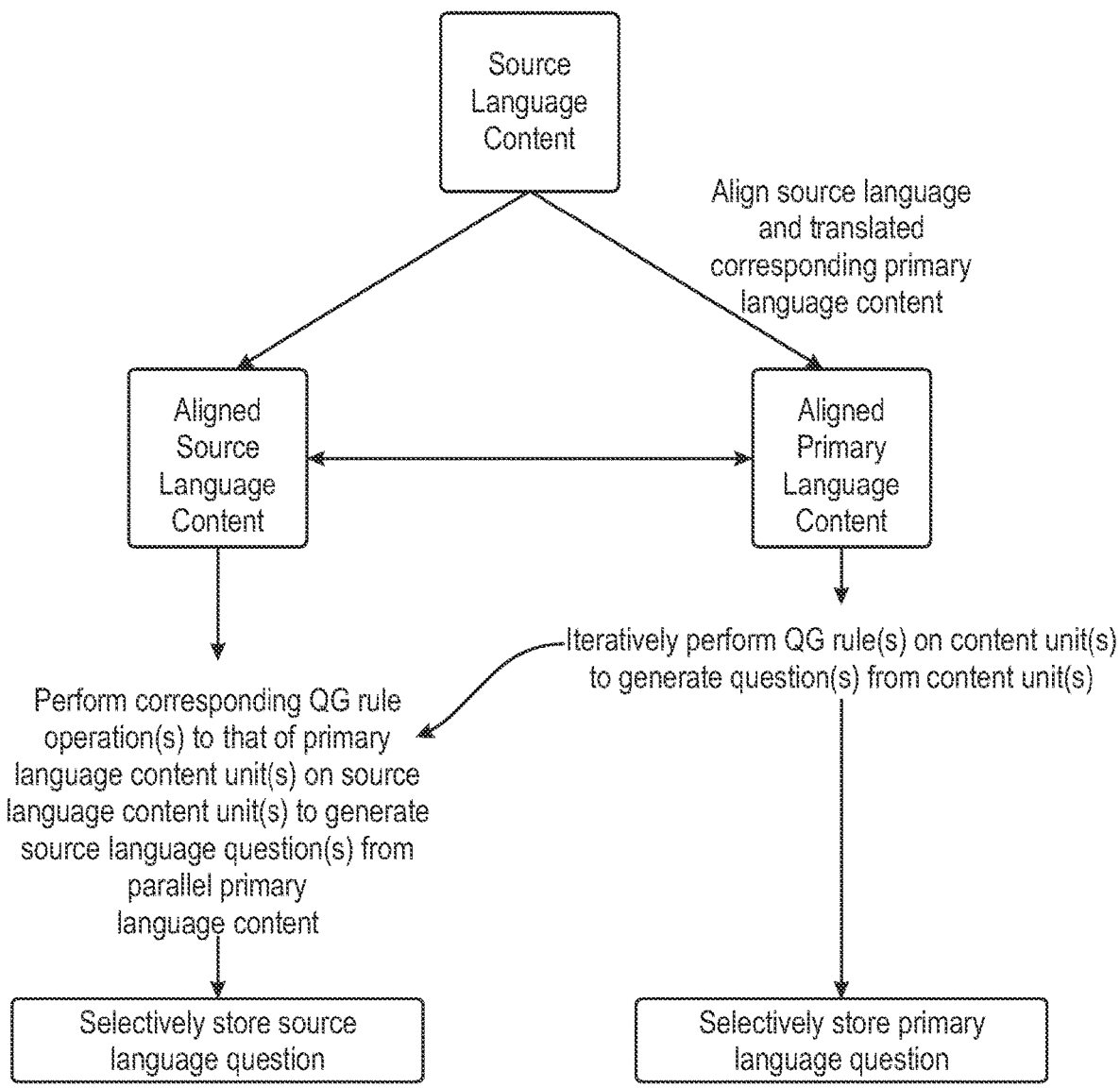
FIG. 9 illustrates an exemplary embodiment of a partial functional block diagram of a parallel construction according to aspects of the present disclosure.

FIG. 9 illustrates an exemplary embodiment of a partial functional block diagram of a parallel construction according to aspects of the present disclosure. The system 900 includes source language content from which questions are intended to be generated. At least a portion of the source language content may be translated into a primary language and the translated primary language content and corresponding source language content may be aligned, for example as set forth above with reference to FIG. 6. After aligning the source and primary language content, the system 900 may iteratively perform one or more QG rule on one or more content units of the aligned primary language content to selectively generate one or more questions from the content unit(s). One or more corresponding QG rule operation(s) may be performed on the source language content unit(s) corresponding to the aligned primary language content unit(s) to selectively generate one or more questions from the content unit(s). The source language question(s) and/or primary language question(s) generated may then be stored and may be selectively associated with one another.

According to aspects of the present disclosure, provided is a method of providing parallel construction for QG corresponding to a content item. The method includes extracting text of at least a portion of the content item as a source language text having a source language, translating at least a portion of the source language text to generate a parallel text having a primary language different from the source language aligning the source language text and the primary language text to create an aligned source language text and an aligned primary language text, determining at least one QG strategy, generating at least one step to be performed on the aligned primary language text based at least in part upon the determined at least one QG strategy, constructing at least one parallel operation corresponding to the at least one step to be performed on the aligned primary language text, and generating a source language question based at least in part upon the constructed at least one parallel operation.

The method may include initializing a primary language question state and a source language question state, each of the primary language question state and the source language question state used to track a status of a transformation of at least one content unit. The method may further include tokenizing at least a portion of the source language text into sentences, wherein the translating at least a portion of the source language text to generate the parallel text having a primary language includes translating at least one of the tokenized sentences. The translating at least one of the tokenized sentences may include transmitting the at least one of the tokenized sentences to a translation tool for translation and obtaining a respective translation of the at least one of the tokenized sentence in the primary language. The at least one of the tokenized sentence and the respective translation of the at least one of the tokenized sentence may be further tokenized into content units. The content units may be words. The aligning the source language text and the primary language text may include performing word alignment on the content units.

The determining at least one QG strategy may include determining a plurality of QG strategies, and further wherein the plurality of QG strategies are looped, for example to generate at least one source or primary language question. Each of the plurality of QG strategies may be applied to a plurality of content units, the plurality of content units corresponding to the content item.

According to further aspects of the present disclosure, provided is a system for providing parallel construction for QG corresponding to a content item. The system includes a network and a server having a processor and a memory, the processor configured to execute one or more instructions causing the server to perform the operations of: extracting text of at least a portion of the content item as a source language text having a source language, translating at least a portion of the source language text to generate a parallel text having a primary language different from the source language, aligning the source language text and the primary language text to create an aligned source language text and an aligned primary language text, determining at least one QG strategy, generating at least one step to be performed on the aligned primary language text based at least in part upon the determined at least one QG strategy, constructing at least one parallel operation corresponding to the at least one step to be performed on the aligned primary language text, and generating a source language question based at least in part upon the constructed at least one parallel operation.

The server may include a storage, and the server may initialize a primary language question state and a source language question state, each of the primary language question state and the source language question state used to track a status of a transformation of at least one content unit, and to store a representation of the primary language question state and the source language question state at the storage of the server. The server may tokenize at least a portion of the source language text into sentences, wherein the translating at least a portion of the source language text to generate the parallel text having a primary language includes translating at least one of the tokenized sentences. The server is further capable of translating at least one of the tokenized sentences include transmitting the at least one of the tokenized sentences to a translation tool for translation and obtaining a respective translation of the at least one of the tokenized sentence in the primary language. The server may tokenize the at least one of the tokenized sentence and the respective translation of the at least one of the tokenized sentence into content units. The server may include a storage, and wherein the content units are words configured to be stored at the storage of the server. The aligning the source language text and the primary language text by the server includes performing word alignment on the content units. The determining at least one QG strategy comprises determining a plurality of QG strategies, and further wherein the plurality of QG strategies are looped, for example to generate at least one source or primary language question. The server may apply each of the plurality of QG strategies to a plurality of content units, the plurality of content units corresponding to the content item.

The following examples show implementations according to aspects of the present disclosure as intended in application to representative textbook content, illustrating key advantages of the method in practice. These QG examples are executed after corpus preparation (e.g. text extraction, pre-processing, translation, and alignment) has been carried out.

EXAMPLE 1

Question type: Matching
Source text: Spanish language economics textbook
In this example, parallel construction is carried out for a matching question (in which key terms must be matched to answer blanks in order to complete a sentence correctly) as English QG is performed on the MT version of the source text. Using ISO 639-2 language codes, steps in English are denoted by 1(eng), 2(eng), ..., and parallel steps in Spanish by 1(spa), 2(spa), ..., etc. All English steps are created by the QG system's production rules; all Spanish steps are then created from the English steps using parallel construction.
1(eng). A production rule in the English QG system selects the following sentence as content knowledge:
However, during the 1980s many borrowing LDCs were unable to cope with the burden of their foreign debt—a situation known as the LDC debt crisis—and, perhaps as a consequence, their economic growth. countries experienced a serious decline,
1(spa). The corresponding Spanish sentence is retrieved using sentence alignment:
 Sin embargo, durante la década de 1980 muchos PMD prestatarios no pudieron hacer frente a la carga de su deuda exterior-situación que se conoce con el nombre timbre de crisis de la deuda de los PMD-y, quizá como consecuencia, el crecimiento económico de estos paises experimentó una grave disminución.
2(eng). Additional production rules in the English system select the following words as answer words:
borrowing, crisis, decline
2(spa). The corresponding Spanish words are retrieved using the word alignment for the content knowledge sentence (Table 1):
prestatarios, crisis, disminución
3(eng). The final English question is constructed as follows (alphabetizing choices):
However, during the 1980s many _____ LDCs were unable to cope with the burden of their foreign debt—a situation known as the LDC debt _____ - and, perhaps as a consequence, their economic growth, countries experienced a serious _____.
Choices: borrowing, crisis, decline
3(spa). The final parallel question in Spanish is:
Sin embargo, durante la decades de 1980 muchos PMD _____ no pudieron pacer frente a la carga de su deuda exterior-situación que se conoce con el nombre de _____ de la deuda de los PMD-y, quizá como consecuencia, el crecimiento económico de estos paises experimentó una grave _____.

Opciones: crisis, disminución, prestatarios

TABLE 1

English-Spanish word alignment for selected content knowledge with words relevant to parallel construction highlighted.

| However | Sin, embargo |
|---|---|
| during | durante |
| the | la |
| 1980s | década, 1980 |
| many | muchos |
| borrowing | prestatarios |
| LDCs | PMD |
| were | pudieron |
| unable | no |
| to | a |
| cope | hacer, frente |
| the | la |
| burden | carga |
| of | de |
| their | su |
| foreign | exterior |
| debt | deuda |
| situation | situación |
| known | se, conoce, con, nombrs |
| as | PMD, como |
| the | el, la |
| debt | deuda |
| crisis | crisis |
| and | y |
| perhaps | quizá |
| consequence | consecuencia |
| economic | economico |
| growth | crecimiento |
| countries | estos, parses |
| experienced | experimentó |
| a | una |
| serious | grave |
| decline | disminución |

In this example, as in every case, all QG decisions are made by the primary language (English in this case) system using its production rules; no decisions involve NLP in the source language (Spanish in this case). For example, the Spanish version of the content knowledge was located using sentence alignment after it was selected in English, not based on direct analysis of its suitability. Parallel construction needs no knowledge of the QG decisions, only the actions that result. To underscore this property, the decision-making logic of the English production rules is deliberately omitted in this example. Parallel construction is capable of simply monitoring the productions of the primary language QG system and replicating them in the source language.

The English sentence illustrates noise that can happen with MT. Near the end there is a syntax error " . . . growth. countries . . . " Not only is the meaning difficult to discern here, it is not entirely faithful to the Spanish source text, which says the economic growth of the countries experienced a decline, not the countries themselves, as would be one reading of the English text. The poor linguistic quality of the English text did not prevent QG from succeeding. However, the noisy translated sentence would never be included in an English textbook as is, nor is the resulting English question acceptable for presentation to students. Remedying these deficiencies would require editing by a human subject matter expert, which is impractical at scale.

Despite the unacceptable quality of the English question, the Spanish question produced by parallel construction is nonetheless entirely acceptable, having the same level of linguistic quality as the original source language text. This is due to parallel construction operating on the original source text directly, thereby sidestepping the problem of MT noise.

By contrast, if the English question had been merely back-translated to Spanish, the difference is stark:

Sin embargo, durante la década de 1980, muchos PMA _____ no pudieron hacer frente a la carga de su deuda externa, una situación conocida como la _____ de la deuda de los PMA, y, tal vez, como consecuencia, su crecimiento económico. Los paises experimentaron un grave _____.

Opciones: crisis, declive, prestatarios

This question is of much lower linguistic quality than the one obtained by parallel construction. It retains the MT noise (and potentially compounds it), thereby making the Spanish version unacceptable as well.

Also note that the acronym "PMD" in the original Spanish content, which stands for "países menos desarrollados" (translated to English as "LDC"="less developed countries"), becomes "PMA" upon back-translation, which is "paises menos avanzados". This translation is actually a correct one, but the question would be problematic for students because it introduces a departure from the textbook's notation with no explanation. Therefore, while the translation would likely be acceptable in many circumstances, for educational applications it is not. The parallel construction method is not susceptible to this problem.

Note that the word alignment for this example (Table 1) is not perfect; not all English words were able to be mapped, for example. This is caused at least in part due to the MT noise present. However, in this case the imperfect alignment does not compromise parallel question construction since the subset of words that are relevant was mapped correctly. Although incomplete or incorrect alignment of the answer words themselves would have been problematic, this example shows that the method is able in some cases to be robust against alignment errors and still succeed despite them.

What if alignment had actually failed on words that were required by parallel construction? This could happen in at least two ways. First, it could happen if the required words were unable to be aligned, then it is not possible to carry out the parallel step in the source language. When this happens, or if for any reason the step cannot be performed with sufficiently high confidence in the result, the question can simply be discarded. This emphasizes precision over recall, and typically has resulted in less than 10% of the questions generated in English being discarded during parallel construction by implementations consistent with the present disclosure. Second, when the word alignment is incorrect, the system still has the potential to produce a valid question, but one that is not strictly identical to its English counterpart. While this is not ideal because the value of the question is not guaranteed in this case, it nonetheless greatly mitigates the risk of errors in meaning or dysfluency that can happen with back-translation, since the source language question will still be accurate and the linguistic quality of the source text will still be preserved.

EXAMPLE 2

Question type: Fill-in-the-blank
Source text: Portuguese language psychopathology textbook In contrast with the matching question in the last example, this fill-in-the-blank questions requires the student to recall the correct answer and type it into an answer blank in order to complete the sentence correctly.

1(eng). A production rule selects an English sentence as content knowledge:

Phenomena of the autonomic nervous system (sympathetic and parasympathetic) can occur, such as sweating profusely, presenting fever, tachycardia and tremors, sometimes gross (including flapping, or asterisks), which is a reflex triggered by pushing the fingertips lightly open, extended, and the response obtained is alternating movements of flexion and extension, forward and backward, like flapping wings).
1(por). The corresponding Portuguese sentence is retrieved using sentence alignment:
Podem ocorrer fenômenos do sistema nervoso autonômico (simpático e parassimpático), como suar profusamente, apresentar febre, taquicardia e tremores, às vezes grosseiros (inclusive flapping, ou asterixis, que é um reflexo desencadeado ao se empurrar levemente as pontas dos dedos da mão bem aberta, estendida, e a resposta obtida são movimentos alternados de flexão e extensão, para frente e para trás, como um bater de asas).
2(eng). A production rule selects the English answer word as:
autonomic
2(por). The corresponding Portuguese word is retrieved using the word alignment for the sentence (Table 2):
autonômico
3(eng). The final English question is constructed as follows:
Phenomena of the _____ nervous system (sympathetic and parasympathetic) can occur, such as sweating profusely, presenting fever, tachycardia and tremors, sometimes gross (including flapping, or asterisks), which is a reflex triggered by pushing the fingertips lightly open, extended, and the response obtained is alternating movements of flexion and extension, forward and backward, like flapping wings).
3(por). The final parallel question in Portuguese is:
Podem ocorrer fenômenos do sistema nervoso _____ (simpático e parassimpático), como suar profusamente, apresentar febre, taquicardia e tremores, às vezes grosseiros (inclusive flapping, ou asteríxis, que é um reflexo desencadeado ao se empurrar levemente as pontas dos dedos da mão bem aberta, estendida, e a resposta obtida são movimentos alternados de flexão e extensão, para frente e para trás, como um bater de asas).

TABLE 2

English-Portuguese word alignment for a portion of selected content knowledge with words relevant to parallel construction highlighted.

| | |
|---|---|
| Phenomena | fenômenos |
| of | do |
| autonomic | autonômico |
| nervous | nervoso |
| system | sistema |
| ... | ... |
| sometimes | às, vezes |
| including | inclusive |
| flapping | flapping, asterixis |

The content knowledge selected in English in Example 2 contains a translation error: the medical term "asterixis" is mistranslated as "asterisks". While this results in a corrupted English question being generated, the Portuguese question is still correct even in spite of this significant error since parallel construction operates directly on the original source text.

Suppose the mistranslated word "asterisks" had been selected as the answer for the English question instead. In this case, it turns out that "asterisks" was not able to be aligned to a source Portuguese word, and thus is not present in the word alignment (this was likely a consequence of the translation error). This would make Step 2(por) unable to be performed and result in the question being discarded. Therefore, even in this case the MT error does not lead to an erroneous question in Portuguese, unlike back-translation.

EXAMPLE 3

Question type: Multiple choice
Source text: Spanish language behavioral physiology textbook
The English QG strategy is to construct a multiple-choice question for a key term in the textbook by presenting its definition along with three other sentences from the textbook as distractors. Since all pertinent content knowledge is in the form of complete sentences (other than the key term itself), only sentence alignment is needed.
1(eng). A production rule selects an English key term as content knowledge:
the corticospinal tract
1(spa). The corresponding Spanish key term is retrieved using word alignment: el tracto corticoespinal
2(eng). A production rule locates the definition of the English key term:
Axon system that originates from the motor cortex and ends in the ventral gray matter of the spinal cord.
2(spa). The corresponding definition in Spanish is retrieved using sentence alignment:
Sistema de axones que se origina en la corteza motora y termina en la sustancia gris ventral de la médula espiral.
3(eng). Production rules select three additional English sentences to serve as the incorrect choices (distractors) for the question:
Axon system that originates in the motor cortex and ends in the ipsilateral ventral gray matter of the spinal cord. Controls the movements of the upper extremities and the trunk.
Axon system that originates from the motor cortex and ends in the contralateral ventral gray matter of the spinal cord. Controls the movements of the distal extremities.
Axon bundle running from the motor cortex to the fifth, seventh, ninth, tenth, eleventh, and twelfth cranial nerves.
3(spa). Using sentence alignment, the corresponding sentences in Spanish are retrieved:
Sistema de axones que se origina en la corteza motora y termina en la sustancia gris ventral ipsilateral de la médula espinal. Controla los movimientos de las extremidades superiores y el tronco.
Sistema de axones que se origina en la corteza motora y termina en la sustaricia gris ventral contralateral de la médula espinal. Coritrola los movimientos de las extremidades distales.
Haz de axones que va desde la corteza motora a los nervios craneales quinto, séptimo, noveno, décimo, onceavo y doceavo.
4(eng). A production rule constructs the English question stem by instantiating a template string with the key term:
What is the corticospinal tract?
4(spa). The Spanish question stem is constructed using a corresponding Spanish template string: ¿ Que es el tracto corticoespinal?
5(eng). The English question is constructed by assembling the components:
What is the corticospinal tract?
   a. Axon system that originates from the motor cortex and ends in the ventral gray matter of the spinal cord.
   b. Axon system that originates in the motor cortex and ends in the ipsilateral ventral gray matter of the spinal cord. Controls the movements of the upper extremities and the trunk.

c. Axon system that originates from the motor cortex and ends in the contralateral ventral gray matter of the spinal cord. Controls the movements of the distal extremities.

d. Axon bundle running from the motor cortex to the fifth, seventh, ninth, tenth, eleventh, and twelfth cranial nerves.

5(spa). The parallel question in Spanish is:

¿ Qué es el tracto corticoespinal?

a. Sistema de axones que se origina en la corteza motora y termina en la sustancia gris ventral de la medula espinal.

b. Sistema de axones que se origina en la corteza motora y termina en la sustancia gris ventral ipsilateral de la médula espinal. Controla los movimientos de las extremidades superiores y el tronco.

c. Sistema de axones que se origina en la corteza motora y termina en la sustancia gris ventral contralateral de la medula espinal. Controla los movimientos de las extremidades distales.

d. Haz de axones que va desde la corteza motora a los nervios craneales quinto, séptimo, novena, décimo, onceavo y doceavo.

Comments:

This example illustrates the ad hoc localization work that is required in some parallel steps. Step 4(eng) used a template string "What is [key_term]?" to construct the question stem. This template string is localized as "¿ Qué es [key_term]?" and used in Step 4(spa). These localized strings may be created in advance and then used for all questions in this category, precisely as is done in English QG.

EXAMPLE 4

Question type: Free response
Source text: Spanish language research methods textbook This example shows construction of a question that requires the student to provide an explanation by writing a short sentence or phrase. The question type is called "free response" because the answers the student is allowed to give are not constrained, in contrast with a multiple-choice question, for example. A model correct answer is also constructed from the content knowledge, which can be provided to the student after they have answered the question to compare with their own response. 1(eng). A production rule selects an English sentence as content knowledge:

Vega (2013) argues that the Likert scale is ordinal because its intervals are unknown.

1(spa). The corresponding Spanish sentence is retrieved using sentence alignment:

Vega (2013) arqumenta que la escala de Likert es ordinal porque sus intervalos son desconocidos.

2(eng). A production rule extracts the independent and dependent clauses from the English sentence:

Vega (2013) argues that the Likert scale is ordinal because its intervals are unknown 2(spa). The corresponding Spanish clauses are obtained using the word alignment for the sentence (Table 3):

Vega (2013) argumenta que la escala de Likert ordinal porque sus intervalos son desconocidos 3(eng). A production rule transforms the English independent clause into a question:
Transform main verb to bare infinitive form.
Vega (2013) argue that the Likert scale is ordinal
Perform subject-auxiliary verb inversion using do-support.
dos Vega (2013) argue that the Likert scale is ordinal
Add interrogative adverb and question mark.
Why does Vega (2013) argue that the Likert scale is ordinal?

3(spa). The corresponding Spanish clause is transformed equivalently:
Add interrogative adverb and question marks.

¿ Por qué Vega (2013) argumenta que la escala de Likert es ordinal?

4(eng). A production rule constructs the English model answer from the dependent clause by writing it as a sentence:

Because its intervals are unknown.

4(spa). The Spanish model answer is analogously constructed from the Spanish dependent clause:

Por que sus intervalos son desconocidos.

5(eng). The final English question and model answer are:
Why does Vega (2013) argue that the Likert scale is ordinal?
Because its intervals are unknown.

5(spa). The final parallel Spanish question and model answer are:

¿ Por qué Vega (2013) argumenta que la escala de Likert es ordinal?
Porque sus intervalos son desconocidos.

TABLE 3

English-Spanish word alignment for selected content knowledge.

| | |
|---|---|
| Vega | Vega |
| 2013 | 2013 |
| argues | arguments |
| that | que |
| the | la |
| Likert | de, Likert |
| scale | escala |
| is | es |
| ordinal | ordinal |
| because | porque |
| its | sus |
| intervals | intervalos |
| are | son |
| unknown | desconocidos |

Constructing the question in English involves simple grammatical transformation of the selected content, which is replicated in Spanish. It is interesting to note that while the transformation is equivalent in the two languages, it is not identical. For example, the English-specific grammatical concepts of subject-auxiliary verb inversion and do-support do not apply in Spanish. This serves as a good illustration of what is meant by localization of the QG actions. Put another way, the goal is the same in both languages, e.g., to transform an independent clause into a question, but the details of implementation in the respective languages are different.

Across the variety of QG scenarios illustrated, a common property is that every decision related to QG is made by the primary language system. The knowledge required for parallel construction includes alignment information plus simple language-specific lexical, syntactical, and grammatical transformations. No knowledge of the QG decision-making process itself is involved or at the least required to be involved.

The parallel construction method described herein may be independent of the subject domain for which QG is desired, as illustrated by its application with equal facility to content across a broad variety of subjects.

Finally, since parallel construction is capable of operating directly on the original source text, the meaning of the original text is preserved and its linguistic quality is not degraded by the QG process, neither of which holds true in general for a back-translation approach, for example. Thus, the parallel construction method is able to achieve higher quality with fewer errors in generated questions.

According to aspects of the present disclosure, provided are apparatuses, systems, and methods for providing a process capable of converting static e-textbooks into interactive coursework automatically. Converting static content into lesson-based courseware with formative practice better supports student learning. Research shows that the Learn by Doing approach can have six times the effect size on learning than reading alone. Implementations consistent with the present disclosure may be configured to take advantage of this Doer Effect by organizing content into topically aligned lessons with formative practice. Implementations consistent with the present disclosure may be capable of generating a learning science-based courseware solution for students and instructors in a fraction of the time and cost of authoring courseware from scratch. Implementations consistent with the present disclosure may support learners and their instructors in many contexts—from face-to-face to fully online instruction.

Implementations consistent with the present disclosure may include one or more process(es) that utilize state-of-the-art machine learning with research-based learning science theory to generate courseware that will help students learn more effectively and efficiently. This may include three tasks—organizing textbook content into lessons, aligning learning objectives with lessons, and generating formative practice for lessons. To organize textbook content into lessons, a textbook structure may be analyzed and used to identify how the content can be chunked into smaller lessons that revolve around a single topic or learning objective. Lessons organized by topic or learning objective support student learning and provide students frequent opportunities to stop and practice what they've just learned. If learning objectives are available in the text, implementations consistent with the present disclosure may be configured to identify them and place them with the appropriate lessons. Formative questions generated for the lesson will be tagged with the learning objective as well. Learning objectives help guide student learning as well as provide instructors with a view of student engagement and learning in the Learning Dashboard. Implementations consistent with the present disclosure may use machine learning techniques to automatically generate questions enabling students to engage in Learn by Doing. The textbook content may be analyzed to identify key information in the text, to generate two types of practice questions based on that textbook-specific information, and to provide scaffolding feedback when students answer incorrectly. These formative questions provide students an opportunity to practice both recognition and recall of key information. These skills are important to learn foundational content and support the Learn by Doing approach.

Question generation according to aspects of the present disclosure may include cutting-edge artificial intelligence question generation capabilities enhance the student learning experience with minimal time and expense. A core component of implementations consistent with the present disclosure is the generation of formative practice questions to accompany topically aligned lessons of content. Integrated practice is what helps turn static content into an interactive courseware experience. Research has shown that engaging with formative practices has six times the effect size on learning than reading alone. In short, formative practice is good for students, and implementations consistent with the present disclosure may be capable of generating these questions automatically.

Implementations consistent with the present disclosure may generates multiple types of questions, for example fill-in-the-blank (FITB) and matching questions. For FITB questions students may type a key term within a sentence and for matching questions students identify the correct location for three terms within a sentence. These two question types may engage students in recognition and recall, which are foundational skills in Bloom's hierarchy. This level of knowledge acquisition is critical to support and scaffold higher order cognitive processes.

Implementations consistent with the present disclosure may generate questions using artificial intelligence (AI) and/or natural language processing (NLP) techniques. These AI and NLP methods may be combined with learning science and pedagogy research to thoughtfully generate questions that would best serve student learning. Processes consistent with the present disclosure may include operations of reading a book, finding facts, evaluating facts, selecting words, and/or adding feedback. Implementations consistent with the present disclosure may perform an operation of reading a book by first reading an entire book or portion thereof to learn the content. The operation of finding facts may include uses machine learning techniques to identify the important facts from the content that would be support student learning. The operation of evaluating facts may include an automated QA process to ensure the facts selected are the best ones possible for questions. The selecting words operations may include identifying the important words from the facts to turn those facts into questions. The adding feedback operation may include adding feedback by searching for related information which could provide scaffolding for the student.

To facilitate the understanding of the embodiments described herein, a number of terms are defined below. The terms defined herein have meanings as commonly understood by a person of ordinary skill in the areas relevant to the present disclosure. Terms such as "a," "an," and "the" are not intended to refer to only a singular entity, but rather include the general class of which a specific example may be used for illustration. The terminology herein is used to describe specific embodiments consistent with the present disclosure, but their usage does not delimit the present disclosure, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of new and useful apparatuses, systems, and methods, it is not intended that such references be construed as limitations upon the scope of this disclosure except as set forth in the following claims

What is claimed is:

1. A method of providing parallel construction for question generation (QG) corresponding to a content item, comprising:
    extracting text of at least a portion of the content item as a source language text having a source language;
    tokenizing the at least a portion of the source language text into one or more sentences;
    machine translating the one or more tokenized sentences of the source language text to generate a parallel text having a primary language different from the source language;
    tokenizing the tokenized one or more sentences of the source language text and the parallel text of the primary language into words;
    aligning the tokenized words of the tokenized one or more sentences of the source language text and the tokenized words of the parallel text of the primary language text using a statistically based alignment method to create an aligned source language text and an aligned primary language text; determining at least one QG strategy;
    for each of the at least one determined QG strategy, performing on the tokenized words of the aligned source language text and the aligned primary language text:
        generating at least one step to be performed on the tokenized words of the aligned primary language text based at least in part upon the determined at least one QG strategy,
        constructing at least one parallel operation that performs on the tokenized words of the aligned source language text at least one corresponding step of the corresponding determined at least one QG strategy that was performed on the corresponding tokenized words of the aligned primary language text,
        generating a source language question based at least in part upon the constructed at least one parallel operation corresponding to the at least one QG strategy performed on the primary language text; and
    selectively storing the generated source language question.

2. The method of claim 1, further comprising:
    Initializing a primary language question state and a source language question state, each of the primary language question state and the source language question state used to track a status of a transformation of at least one word.

3. The method of claim 1,
    wherein the translating at least a portion of the source language text to generate the parallel text having a primary language further comprises translating at least one of the tokenized sentences.

4. The method of claim 3, wherein the translating at least one of the tokenized sentences further comprises transmitting the at least one of the tokenized sentences to a translation tool for translation, and obtaining a respective translation of the at least one of the tokenized sentence in the primary language.

5. The method of claim 1, wherein for each of the at least one determined QG strategy, iteratively performing on the tokenized words and the aligned primary language text:
    generating at least one step to be performed on the tokenized words of the aligned primary language text based at least in part upon the determined at least one QG strategy,
    constructing at least one parallel operation that performs on the tokenized words of the aligned source language text at least one corresponding step of the corresponding determined at least one QG strategy that was performed on the corresponding tokenized words of the aligned primary language text, and
generating a source language question based at least in part upon the constructed at least one parallel operation corresponding to the at least one QG strategy performed on the primary language text.

6. The method of claim 1, wherein the aligning the source language text and the primary language text includes performing word alignment on the tokenized words.

7. The method of claim 1, wherein the determining at least one QG strategy comprises determining a plurality of QG strategies, and further wherein the plurality of QG strategies are looped.

8. The method of claim 7, wherein each of the plurality of QG strategies is applied to a plurality of tokenized words, the plurality of tokenized words corresponding to the content item.

9. A system for providing parallel construction for question generation (QG) corresponding to a content item, comprising:
    a network; and
    a server having a processor, a memory, a transform engine, a translation engine, a candidate engine, and a mapping engine, the processor configured to execute one or more instructions causing the server to perform the operations of:
        extracting, via the transform engine, text of at least a portion of the content item as a source language text having a source language;
        tokenizing, via the transform engine, the at least a portion of the source language text into one or more sentences;
        machine translating, via the translation engine, of the one or more tokenized sentences of the source language text to generate a parallel text having a primary language different from the source language;
        tokenizing the tokenized one or more sentences of the source language text and the parallel text of the primary language into words;
        aligning the tokenized words of the tokenized one or more sentences of the source language text and the tokenized words of the parallel text of the primary language text using a statistically based alignment method to create an aligned source language text and an aligned primary language text;
        determining at least one QG strategy;
        for each of the at least one determined QG strategy, performing on the tokenized words of the aligned source language text and the aligned primary language text:
            generating, via the candidate engine, at least one step to be performed on the tokenized words of the aligned primary language text based at least in part upon the determined at least one QG strategy,
            constructing at least one parallel operation that performs on the tokenized words of the aligned source language text at least one corresponding step of the corresponding determined at least one QG strategy that was performed on the corresponding tokenized words of the aligned primary language text, generating, via the mapping engine, a source language question based at least in part upon the constructed at least one parallel operation corresponding to the at least one QG strategy performed on the primary language text; and selectively storing the generated source language question.

10. The system of claim 9, wherein the server comprises a storage, and further wherein the server is further configured to initialize a primary language question state and a source language question state, each of the primary language question state and the source language question state used to track a status of a transformation of at least one tokenized word, and to store a representation of the primary language question state and the source language question state at the storage of the server.

11. The system of claim 9, wherein the server is further configured to translate at least a portion of the source language text to generate the parallel text having a primary language by translating at least one of the tokenized sentences.

12. The system of claim 11, wherein the server is further configured to translate at least one of the tokenized sentences by transmitting the at least one of the tokenized sentences to a translation tool for translation, and obtaining a respective translation of the at least one of the tokenized sentence in the primary language.

13. The system of claim 12, wherein the server includes a storage, and wherein the tokenized words are configured to be stored at the storage of the server.

14. The system of claim 12, wherein the aligning the source language text and the primary language text by the server includes performing word alignment on the tokenized words.

15. The system of claim 11, wherein the server is further configured to, for each of the at least one determined QG strategy, iteratively performing on the tokenized words and the aligned primary language text:

generating at least one step to be performed on the tokenized words of the aligned primary language text based at least in part upon the determined at least one QG strategy, constructing at least one parallel operation that performs on the tokenized words of the aligned source language text at least one corresponding step of the corresponding determined at least one QG strategy that was performed on the corresponding tokenized words of the aligned primary language text, and generating a source language question based at least in part upon the constructed at least one parallel operation corresponding to the at least one QG strategy performed on the primary language text.

16. The system of claim 9, wherein the determining at least one QG strategy comprises determining a plurality of QG strategies, and further wherein the plurality of QG strategies are looped.

17. The system of claim 16, wherein the server is configured to apply each of the plurality of QG strategies to a plurality of tokenized words, the plurality of tokenized words corresponding to the content item.

* * * * *